United States Patent

Matsuda et al.

[11] Patent Number: 6,141,617
[45] Date of Patent: Oct. 31, 2000

[54] VEHICLE CONTROL APPARATUS

[75] Inventors: Shohei Matsuda; Hiroshi Sekine; Makoto Otabe; Yuji Sakaki, all of Saitama, Japan

[73] Assignee: Honda Giken Kogyo Kabushiki Kaisha, Tokyo, Japan

[21] Appl. No.: 09/056,243

[22] Filed: Apr. 7, 1998

[30] Foreign Application Priority Data

Apr. 9, 1997 [JP] Japan ................................. 9-091168

[51] Int. Cl.⁷ ................................................ G06F 165/00
[52] U.S. Cl. .......................... 701/72; 340/438; 340/905; 701/208
[58] Field of Search ................................... 701/1, 36, 41, 701/43, 48, 70, 72, 80, 93, 97, 200, 207, 208, 213; 340/425.5, 438, 440, 441, 466, 467, 470, 471, 905; 342/357.09, 357.1, 357.12, 357.13, 357.14, 357.17, 385, 386

[56] References Cited

U.S. PATENT DOCUMENTS

| | | | |
|---|---|---|---|
| 5,539,397 | 7/1996 | Asanauma et al. | 340/901 |
| 5,546,311 | 8/1996 | Sekine | 364/449 |
| 5,661,650 | 8/1997 | Sekine et al. | 364/424.027 |

FOREIGN PATENT DOCUMENTS 5-141979   6/1993   Japan .
8-147598   6/1996   Japan .

*Primary Examiner*—William A. Cuchlinski, Jr.
*Assistant Examiner*—Edward Pipala
*Attorney, Agent, or Firm*—Carrier, Blackman & Associates, P.C.; Joseph P. Carrier; William D. Blackman

[57] ABSTRACT

Vehicle control apparatus enables a vehicle to positively and safely pass a curve present in a forward road ahead of the vehicle, irrespective of any error in road data used by the apparatus and any error in a detected vehicle position. The apparatus calculates a predicted passing speed for a curve on the basis of a vehicle speed and a vehicle position, and compares same with a maximum passable speed for the curve which is calculated on the basis of map information and the vehicle position to thereby determine whether the vehicle can positively and safely pass the curve. If the apparatus determines that the vehicle cannot positively and safely pass the curve, warning, automatic deceleration and/ or automatic steering is executed by a control mechanism of the apparatus. At this time, the apparatus compares an actual transverse acceleration or an actual yaw rate detected by a transverse acceleration sensor or a yaw rate sensor with a reference transverse acceleration or a reference yaw rate presumed from a road shape determined by a passage-state decision quantity calculating mechanism, and a regulating mechanism regulates a controlled variable and a control timing for effecting the warning, the automatic deceleration and/or the automatic steering, thereby compensating for any error in the road data and any error in the vehicle position.

23 Claims, 15 Drawing Sheets

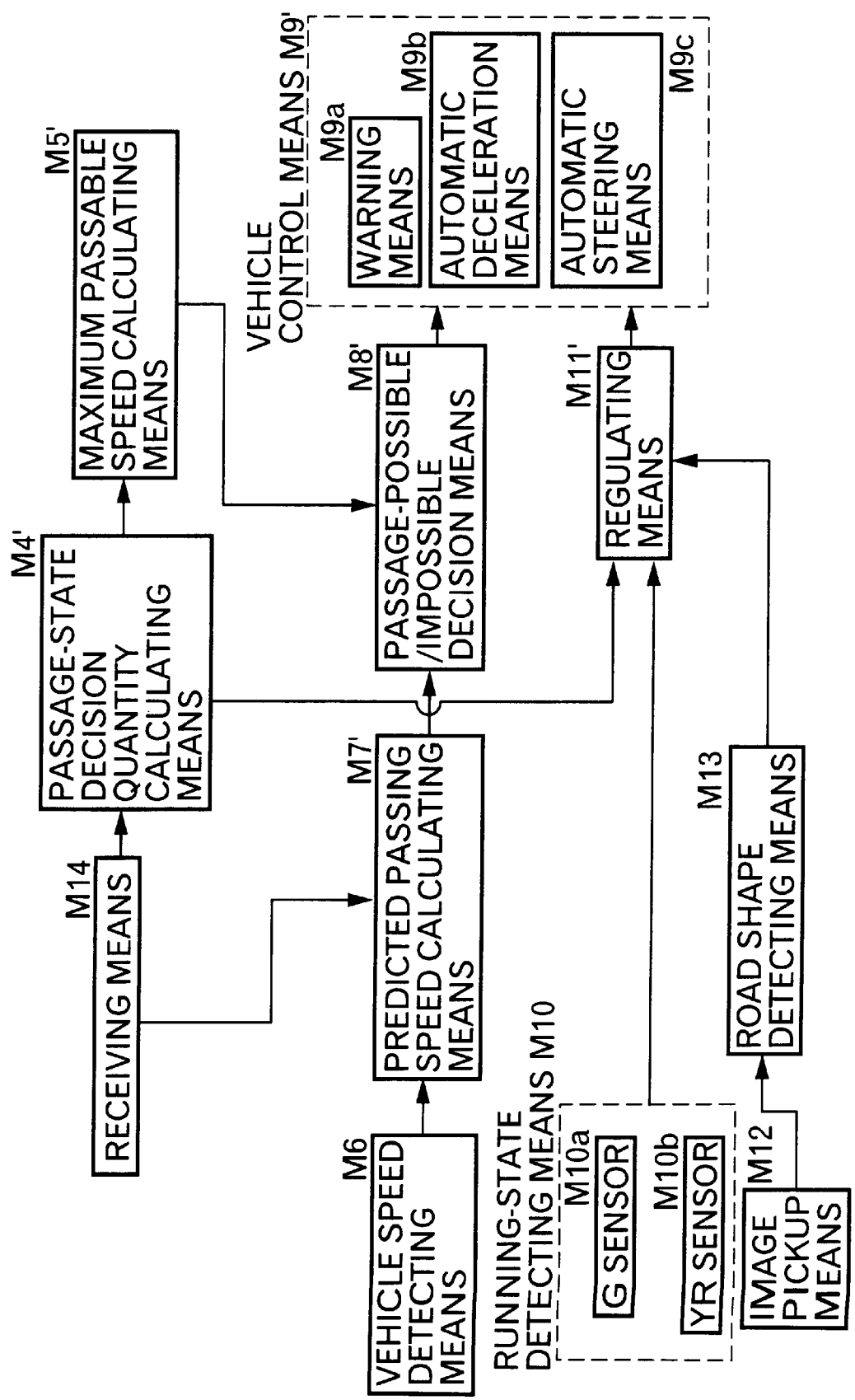

VEHICLE CONTROL APPARATUS

BACKGROUND OF THE INVENTION

1. Field of the Invention

The present invention relates to a vehicle control apparatus which controls a vehicle on the basis of map data or information provided from outside the vehicle so that the vehicle can safely pass a curve forward thereof.

2. Description of Relevant Art

In the field of such vehicle control apparatus, Japanese Patent Applicaiton Laid-Open No. 5-141979 discloses a known apparatus which presumes a radius of curvature of a curve of a road by calculating the radius of an arc which passes through three nodes, compares a maximum passable speed of a vehicle calculated based on the radius of curvature of the curve with a predicted passing speed of the vehicle calculated based on a current vehicle speed, and, if the predicted passing speed is not greater than the maximum passable speed, determines that the vehicle can safely pass the curve.

However, owing to an error in the map data, repair of the road or the like, a road shape determined from map data and an actual road shape occasionally do not coincide with each other, as shown in FIG. 15A. In this case, if vehicle control such as automatic deceleration is executed on the basis of the presumed road shape which is different from the actual one, a driver will have an uneasy feeling of improper control. Otherwise, owing to an error in the detection of a vehicle position on a map, a detected vehicle position and an actual vehicle position occasionally do not coincide with each other, as shown in FIG. 15B. In this case as well, if vehicle control such as automatic deceleration is executed on the basis of the presumed vehicle position different from the actual one, a driver will, again, have an uneasy feeling of improper control.

SUMMARY OF THE INVENTION

The present invention has been made in view of the above-described limitations and disadvantages of the known systems, and an object of the present invention is to compensate for an error in road data or an error in a vehicle position and execute appropriate vehicle control.

To achieve the above object, there is provided according to a first aspect of the invention a vehicle control apparatus comprising map information output means for outputting map information containing road data, vehicle position detecting means for detecting a vehicle position on a map, vehicle speed detecting means for detecting a vehicle speed, vehicle control means for controlling a vehicle based on the road data on a road forward of the vehicle position and the vehicle speed, running-state detecting means for detecting a running state of the vehicle, and regulating means for regulating at least one of a controlled variable and a control timing of the vehicle control means based on the detected running state of the vehicle.

In accordance with the above construction, in controlling the vehicle on the basis of the road data on the road forward of the vehicle position and the vehicle speed, at least one of the controlled variable and the control timing of the vehicle control means is regulated on the basis of the detected running state of the vehicle. Accordingly, any error in the road data and/or any error in the vehicle position are compensated for so that appropriate vehicle control may be executed, thereby making it possible to reduce the occurrence of uneasy feelings of improper control experienced by a driver.

According to a second aspect of the invention there is provided a vehicle control apparatus comprising map information output means for outputting map information containing road data, vehicle position detecting means for detecting a vehicle position on a map, vehicle speed detecting means for detecting a vehicle speed, vehicle control means for controlling a vehicle based on the road data on a road forward of the vehicle position and the detected vehicle speed, image pickup means for picking up an image of the road forward of the vehicle, road shape detecting means for detecting a road shape based on the image of the road, and regulating means for regulating at least one of a controlled variable and a control timing of the vehicle control means based on the detected road shape.

In accordance with the above construction, in controlling the vehicle on the basis of the road data on the road forward of the vehicle position and the vehicle speed, at least one of the controlled variable and the control timing of the vehicle control means is regulated on the basis of the detected road shape. Accordingly, any error in the road data and/or any error in the vehicle position are compensated for to execute appropriate vehicle control, thereby making it possible to reduce the occurrence of uneasy feelings of improper control experienced by a driver.

According to a third aspect of the invention there is provided a vehicle control apparatus comprising map information output means for outputting map information containing road data, vehicle position detecting means for detecting a vehicle position on a map, vehicle speed detecting means for detecting a vehicle speed, vehicle control means for controlling a vehicle based on the road data on a road forward of the vehicle position and the detected vehicle speed, receiving means for receiving information on a road shape, which information is provided from outside the vehicle, and regulating means for regulating at least one of a controlled variable and a control timing of the vehicle control means based on the received information on the road shape.

In accordance with the above construction, in controlling the vehicle on the basis of the road data on the road forward of the vehicle position and the vehicle speed, at least one of the controlled variable and the control timing of the vehicle control means is regulated on the basis of the received information on the road shape. Accordingly, any error in the road data and/or any error in the vehicle position are compensated for to execute appropriate vehicle control, thereby making it possible to reduce the occurrence of uneasy feelings of improper control experienced by a driver.

According to a fourth aspect of the invention there is provided a vehicle control apparatus comprising, receiving means for receiving information on a road shape, which information is provided from outside a vehicle, vehicle speed detecting means for detecting a vehicle speed, vehicle control means for controlling the vehicle based on the received information and the detected vehicle speed, running-state detecting means for detecting a running state of the vehicle, and regulating means for regulating at least one of a controlled variable and a control timing of the vehicle control means based on the detected running state of the vehicle.

In accordance with the above construction, in controlling the vehicle on the basis of the vehicle speed and the information on the road shape which information is provided from outside the vehicle, at least one of the controlled variable and the control timing of the vehicle control means is regulated on the basis of the detected running state of the vehicle. Accordingly, any error in the road data and/or any error in the vehicle position are compensated for to execute appropriate vehicle control, thereby making it possible to reduce the occurrence of uneasy feelings of improper control experienced by a driver.

According to a fifth aspect of the invention there is provided a vehicle control apparatus comprising receiving means for receiving information on a road shape, which information is provided from outside a vehicle, vehicle speed detecting means for detecting a vehicle speed, vehicle control means for controlling the vehicle based on the received information and the detected vehicle speed, image pickup means for picking up an image of a road forward of the vehicle, road shape detecting means for detecting a road shape based on the image of the road, and regulating means for regulating at least one of a controlled variable and a control timing of the vehicle control means based on the detected road shape.

In accordance with the above construction, in controlling the vehicle on the basis of the vehicle speed and information on the road shape, which information is provided from outside the vehicle, at least one of the controlled variable and/or the control timing of the vehicle control means is regulated on the basis of the detected road shape. Accordingly, any error in the road data and/or any error in the vehicle position are compensated for to execute appropriate vehicle control, thereby making it possible to reduce the occurrence of uneasy feelings of improper control experienced by a driver.

Other objects, advantages and salient features of the invention will become apparent from the following detailed description which, in conjunction with the annexed drawings discloses the preferred embodiments of the present invention.

BRIEF DESCRIPTION OF THE DRAWINGS

FIG. 14 is a block diagram similar to FIG. 1, but showing the fifth and sixth preferred embodiments of the invention.

DETAILED DESCRIPTION OF THE PREFERRED EMBODIMENTS

A mode of the present invention will now be described by way of presently preferred embodiments of the invention shown in the accompanying drawings.

Figure 1:
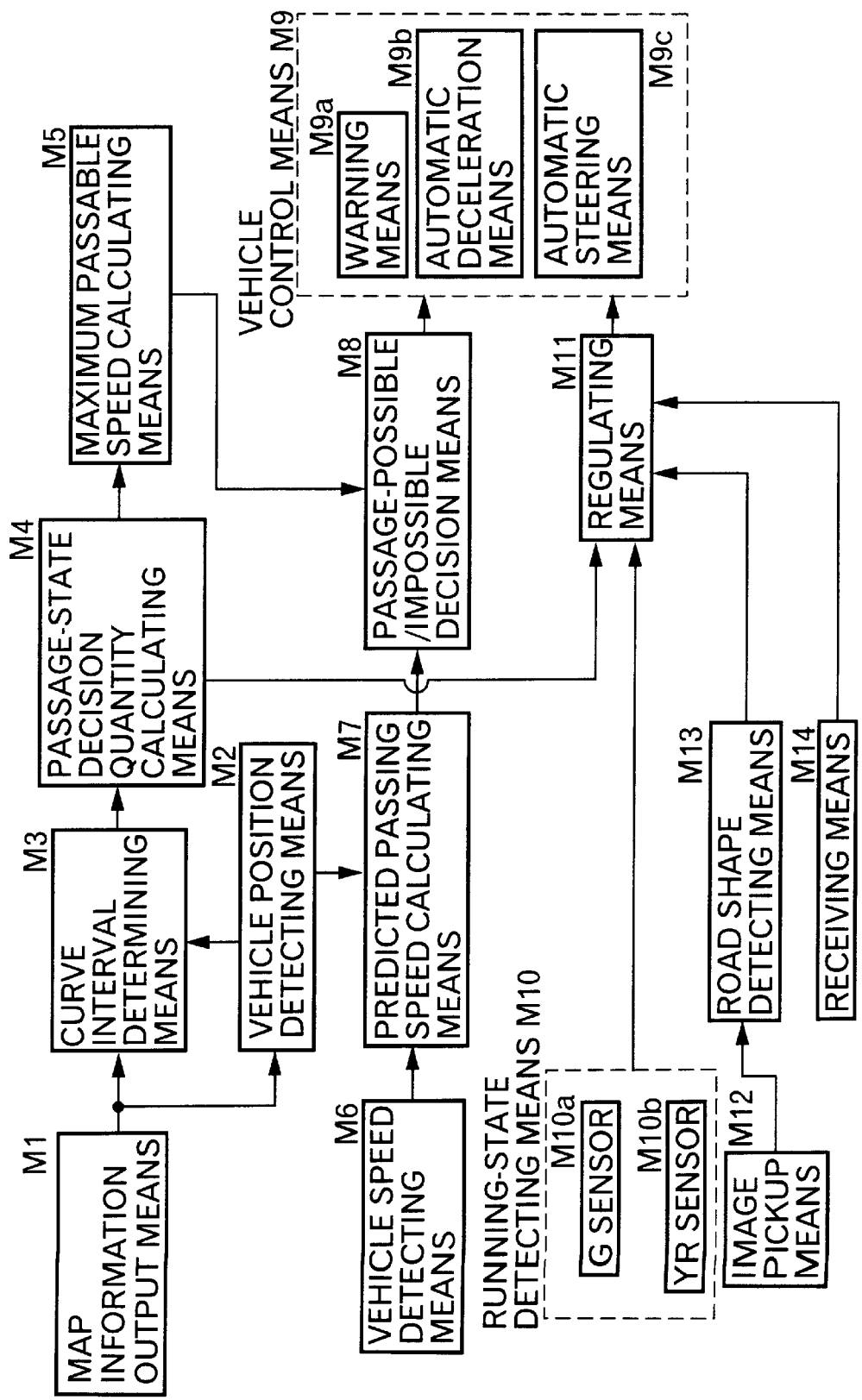
FIG. 1 is a block diagram showing the entire configuration of the apparatus according to a preferred embodiment of the present invention.
Figure 2:
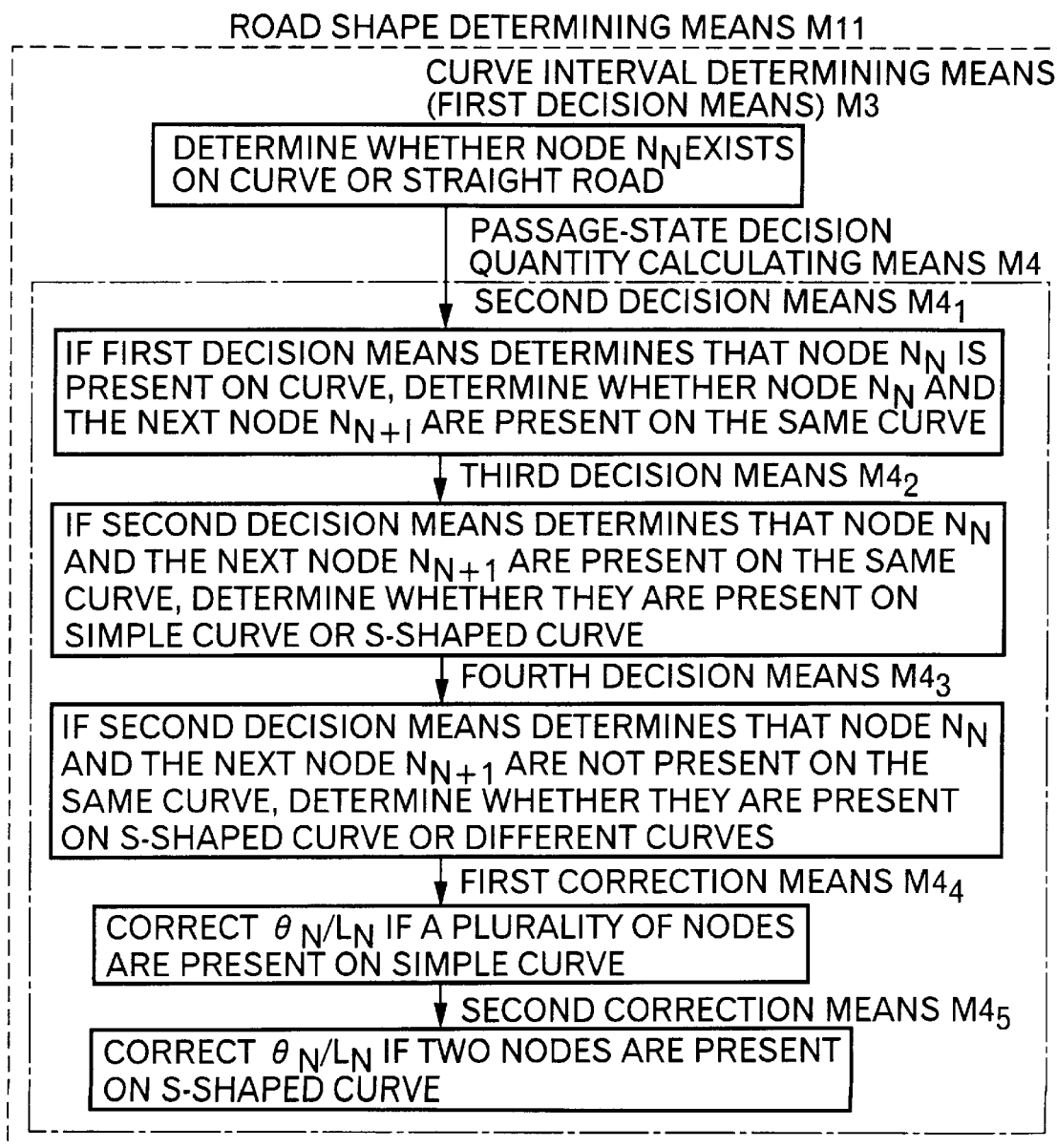
FIG. 2 is an explanatory view of the function of a curve interval decision means and that of a passage-state decision quantity calculating means in the apparatus of FIG. 1.
Figure 3:
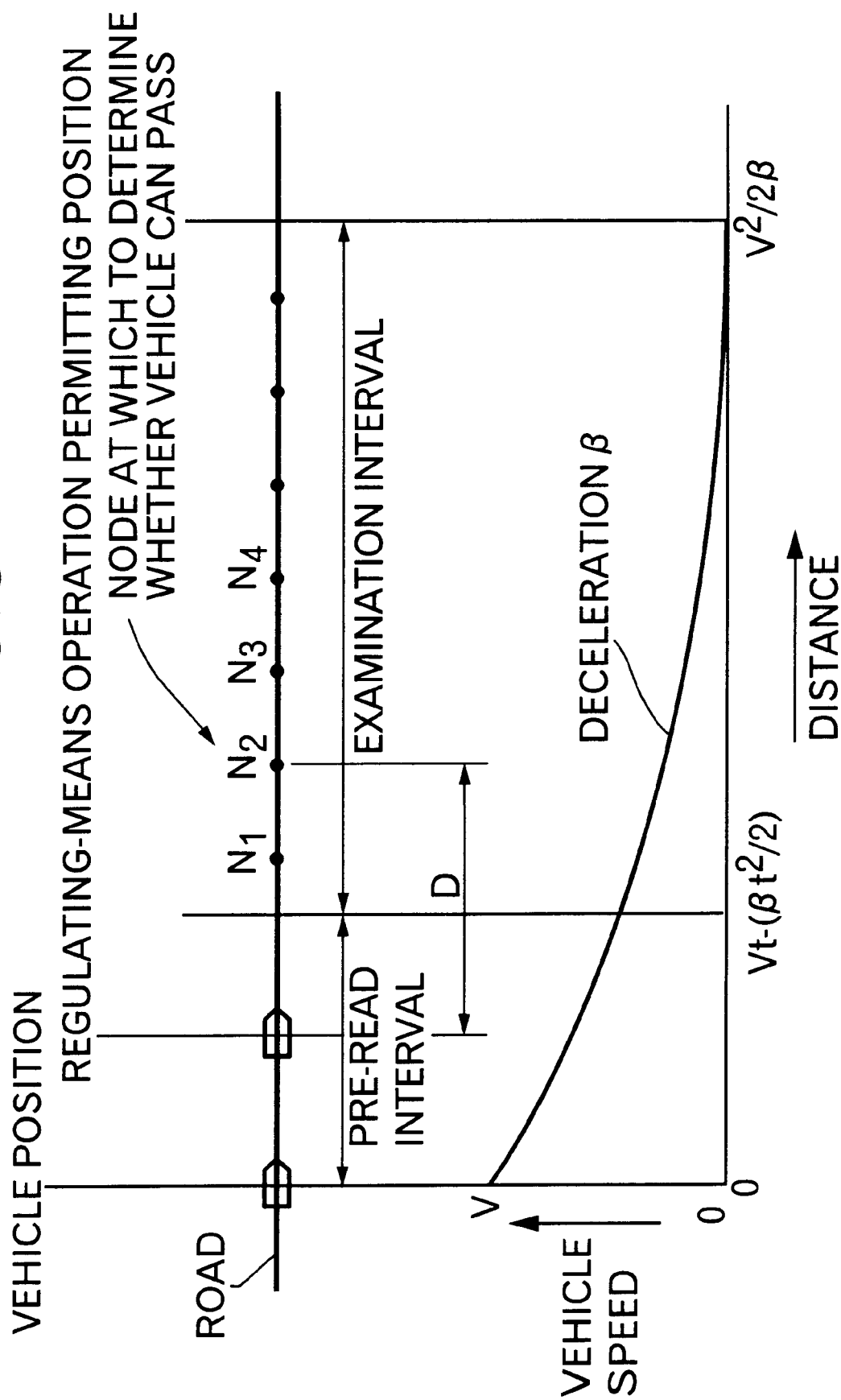
FIG. 3 is an explanatory view of a pre-read interval and an examination interval used by apparatus of FIG. 1.
Figure 4:
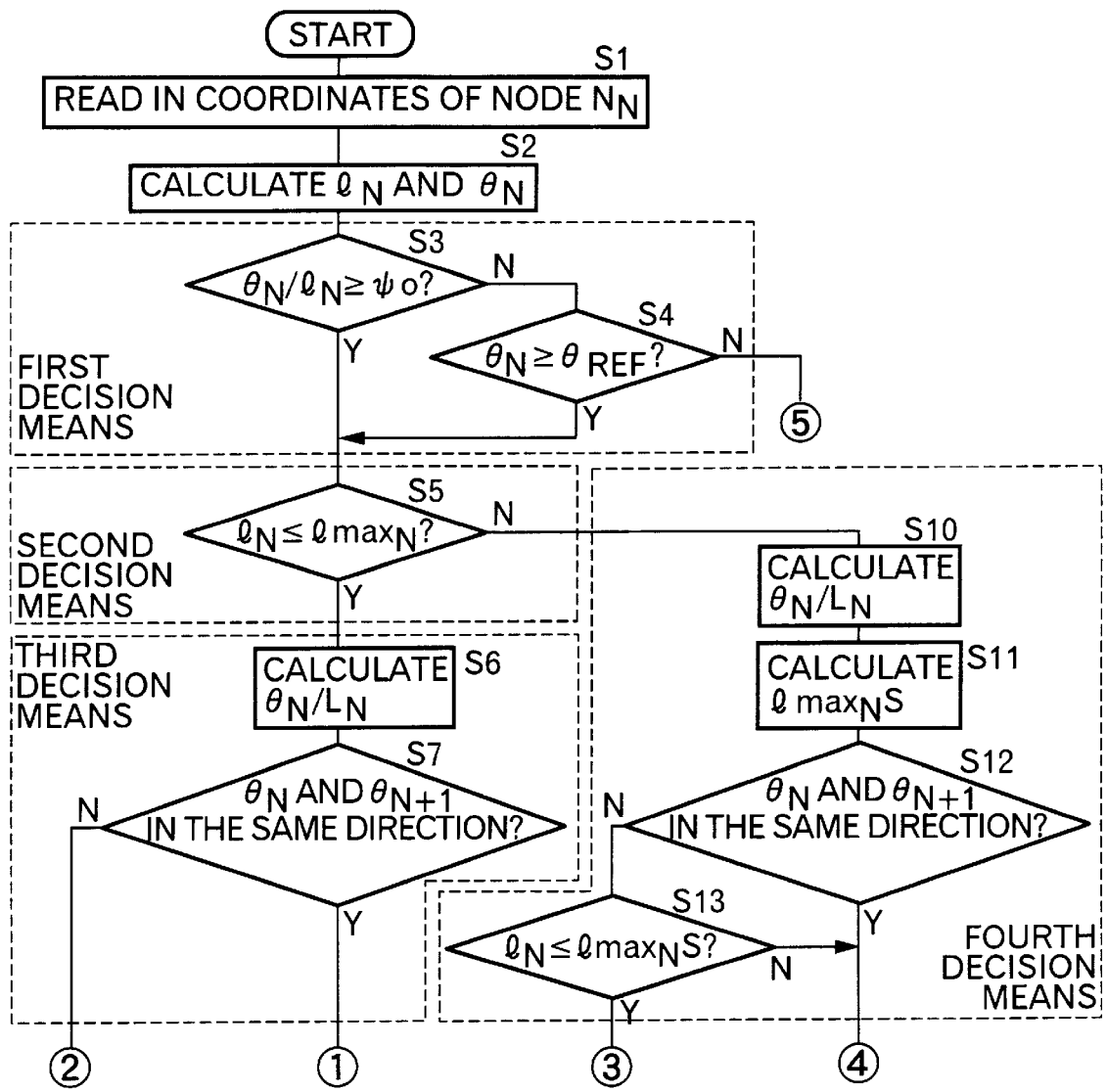
FIG. 4 is a first segmentary view of a flowchart showing control operation of the apparatus of FIG. 1.
Figure 5:
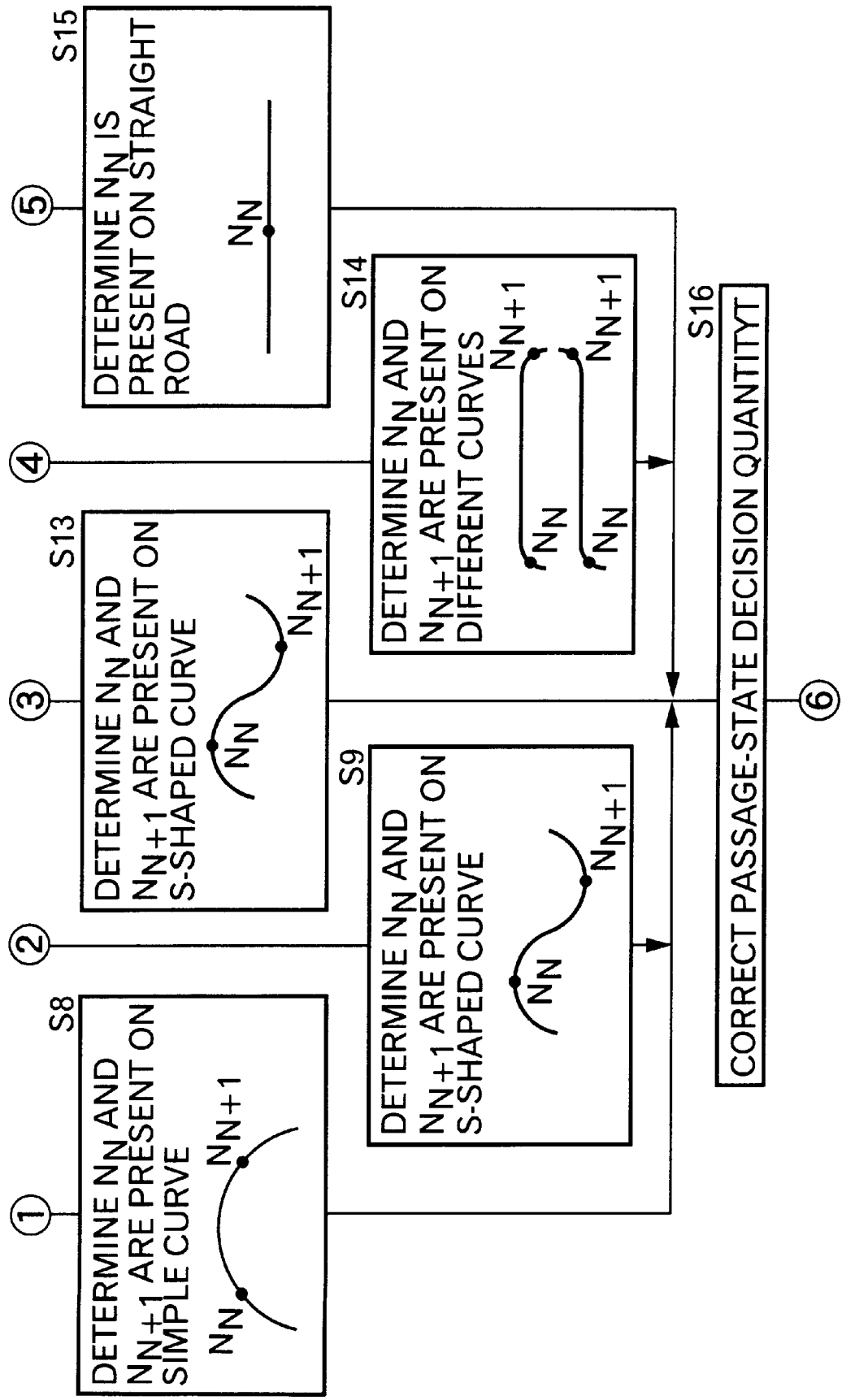
FIG. 5 is a second segmentary view of the flowchart.
Figure 6:
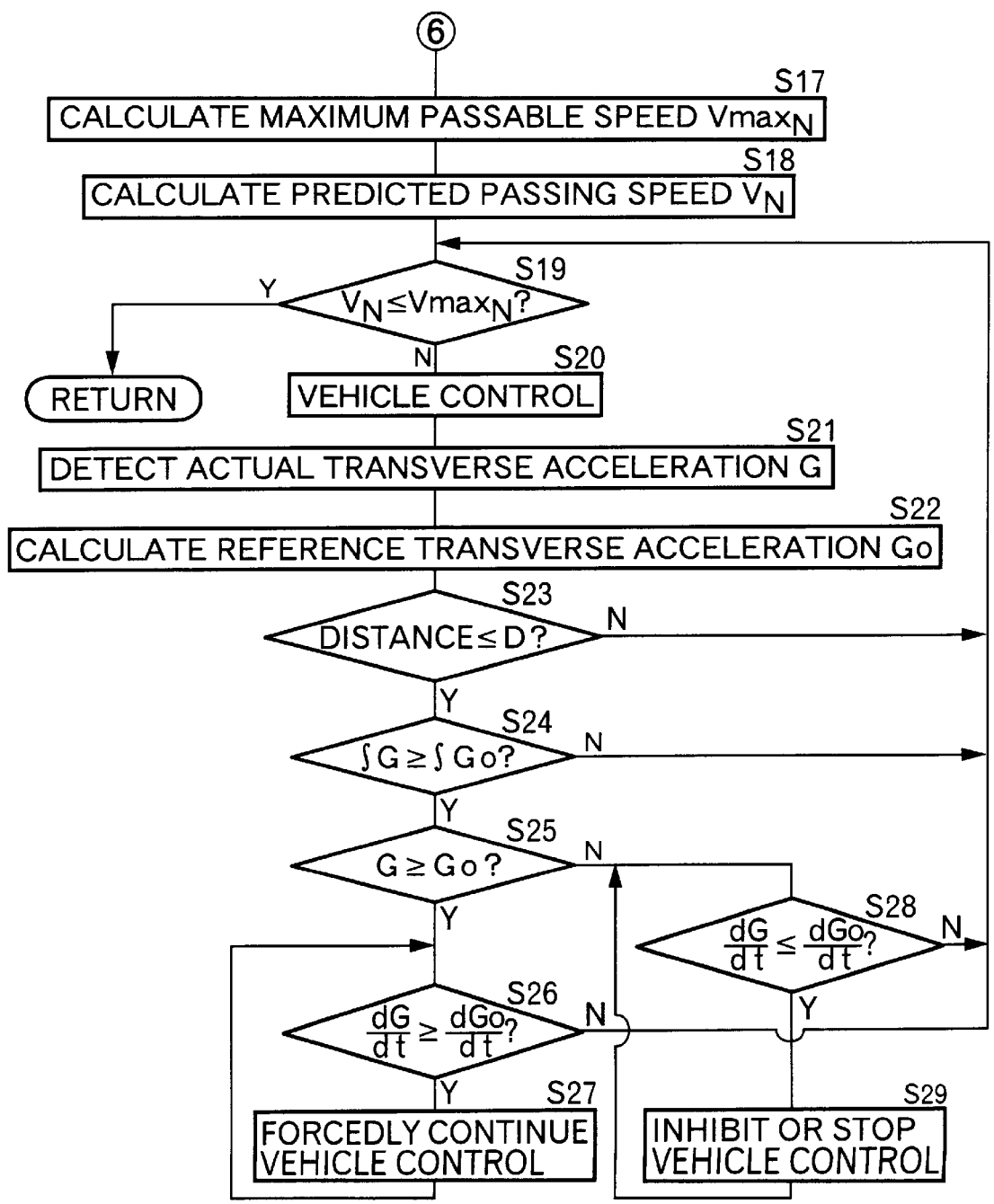
FIG. 6 is a third segmentary view of the flowchart.
Figure 7:
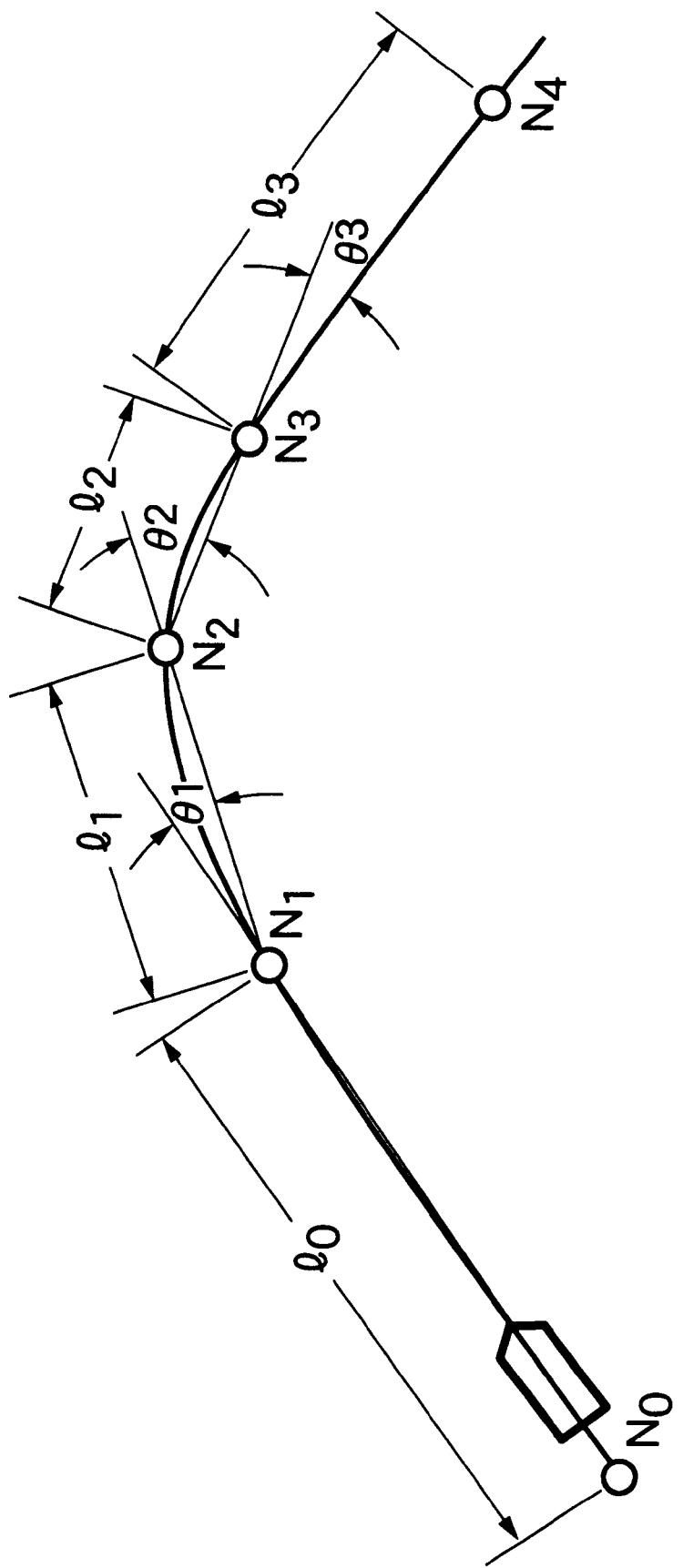
FIG. 7 is an explanatory view of a link length $l_N$ and an intersection angle $\theta_N$ used in the control operation.

FIGS. 1 to 11 illustrate a first preferred embodiment of the present invention, wherein FIG. 1 is a block diagram showing the entire configuration of an apparatus according to a preferred embodiment of the present invention; FIG. 2 is an explanatory view of the function of curve interval decision means and that of passage-state decision quantity calculating means of the apparatus; FIG. 3 is an explanatory view of a pre-read interval and an examination interval; FIG. 4 is a first segmentary view of a flowchart of control operation of the apparatus; FIG. 5 is a second segmentary view of the flowchart; FIG. 6 is a third segmentary view of the flowchart; FIG. 7 is an explanatory view of a link length $l_N$ and an intersection angle $\theta_N$; FIGS. 8A and 8B are explanatory views of Step S5 of the flowchart; FIGS. 9A, 9B and 9C are explanatory views of a definition of a passage-state decision quantity $\theta_N/L_N$; FIGS. 10A and 10B are explanatory views of Step S13 of the flowchart; and FIGS. 11A and 11B are views showing maps for retrieving correction coefficients $K_C$ and $K_S$.

As shown in FIG. 1, a vehicle control apparatus according to the embodiment includes map information output means M1, vehicle position detecting means M2, curve interval decision means M3, passage-state decision quantity calculating means M4, maximum passable speed calculating means M5, vehicle speed detecting means M6, predicted passing speed calculating means M7, passage-possible/impossible decision means M8, vehicle control means M9, running-state detecting means M10, regulating means M11, image pickup means M12, road shape detecting means M13, and receiving means M14.

The map information output means M1 and the vehicle position detecting means M2 are incorporated in a well-known automobile navigation system. The map information output means M1 reads out and outputs road data for a predetermined area which is previously stored in an IC card, a CD-ROM, a rewritable MO (magneto-optical disk) or the like, and the vehicle position detecting means M2 superimposes vehicle position data received at a GPS antenna onto the road data and detects a vehicle position P on a map. The road data is composed of the coordinates of a multiplicity of nodes $N_N$ which are set on roads at predetermined intervals.

As is apparent from FIG. 2 together with FIG. 1, the curve interval decision means M3 which constitutes first decision means determines whether a node $N_N$ forward of the vehicle position P is present on a curve or a straight road based on the road data and the vehicle position P. The passage-state decision quantity calculating means M4 includes second decision means $M4_1$, third decision means $M4_2$, fourth decision means $M4_3$, first correction means $M4_4$ and second correction means $M4_5$ (the contents will be described in detail later), and calculates a passage-state decision quantity $\theta_N/L_N$ which is an index for determining whether the vehicle can safely pass the curve.

The maximum passable speed calculating means M5 calculates a maximum passable speed $V_{maxN}$ which is a maximum vehicle speed at which the vehicle can safely pass the node $N_N$, on the basis of the passage-state decision quantity $\theta_N/L_N$ and a preset limit transverse acceleration $G_{max}$ (or a set limit yaw rate $YR_{max}$).

The vehicle speed detecting means M6 detects a current vehicle speed V of the vehicle on the basis of the output of a wheel speed sensor provided at each wheel. The predicted passing speed calculating means M7 calculates a predicted passing speed $V_N$ at which the vehicle passes the node $N_N$, on the basis of the vehicle speed V, the vehicle position P and a preset reference deceleration β for the vehicle. The passage-possible/impossible decision means M8 compares the predicted passing speed $V_N$ with the maximum passable speed $V_{maxN}$ and, if $V_N \leq V_{maxN}$, determines that the vehicle can pass the node $N_N$. If $V_N > V_{maxN}$ the passage-possible/impossible decision means M8 determines that the vehicle cannot easily pass the node $N_N$, and operates the vehicle control means M9. The vehicle control means M9 includes warning means M9a for warning a driver to carry out a deceleration operation or a steering operation, by means of a buzzer or a lamp, automatic deceleration means M9b for decelerating the vehicle speed by operating brakes or lowering an engine output, and automatic steering means M9c for generating a steering assisting force along a curve by operating a power steering device or the like.

The running-state detecting means M10 includes a transverse acceleration sensor M10a for detecting a transverse acceleration G of the vehicle and/or a yaw rate sensor M10b for detecting a yaw rate YR of the vehicle. The transverse acceleration sensor M10a is used in the first preferred embodiment of the invention, while the yaw rate sensor M10b is used in a second preferred embodiment of the invention. The regulating means M11 compares the passage-state decision quantity calculated by the passage-state decision quantity calculating means M4 with the running state of the vehicle detected by the running-state detecting means M10, and regulates the controlled variable and the control timing of the vehicle control means M9.

The image pickup means M12 includes a television camera or the like, and recognizes as images white lines on a road, guard rails, traffic signs and the like. The road shape detecting means M13 detects a directional change quantity (such as a radius of curvature, an entrance or an exit of the road, etc.) which represents the state of an actual curve of the road, on the basis of the output of the image pickup means M12, and regulates the controlled variable and the control timing of the vehicle control means M9 via the regulating means M11. The image pickup means M12 and the road shape detecting means M13 are used in a third preferred embodiment of the invention.

The receiving means M14 detects a directional change quantity which represents the state of an actual curve of the road, by receiving a radio wave or an optical wave from a beacon or the like installed in the vicinity of the road, or a magnetic signal from a magnetic signal device. The receiving means M14 is used in a fourth preferred embodiment of the invention.

As shown in FIG. 3, a pre-read interval and an examination interval are set forward of the vehicle position P along a road. The pre-read interval is set between the vehicle position P and a node $N_N$ for which a determination is to be made whether the vehicle can safely pass the node. A predetermined time t is ensured before the vehicle reaches the node $N_N$ after having passed through the pre-read interval, and within the predetermined time t, it is determined 4 whether the vehicle can safely pass the node, and if necessary the vehicle control means M9 is operated. As to each node $N_N$ present within the examination interval, whether the vehicle can pass the node $N_N$ is individually, successively determined, whereby it is possible to avoid an unnecessary decision as to whether the vehicle can pass too distant a node $N_N$.

The pre-read interval is determined by a distance $Vt - (\beta t^2/2)$ to be travelled by the vehicle within the predetermined time t, on the basis of the preset reference deceleration β which is presumed to be produced by braking if it is assumed that the driver voluntarily starts the braking at the vehicle position P in order to pass a curve ahead of the vehicle. The starting point of the examination interval is set to the terminating end of the pre-read interval, and the terminating end of the examination interval is set to a stop position of the vehicle which decelerates at the reference deceleration β, i.e., a position ahead of the vehicle position P by a distance $V^2/2\beta$.

A regulating-means operation permitting position is set to a position which is a distance D short of a node $N_N$ for which a determination of the passability thereof is to be made. At any position short of the regulating-means operation permitting position, the operation of the regulating means M11 is not permitted with respect to the node $N_N$ for which a determination of the passability thereof is to be made, and after the vehicle has reached the regulating-means operation permitting position, the operation of the regulating means M11 is controlled according to an actual running state of the vehicle detected by the running-state detecting means M10 or the state of the actual curvature of the road, the image of which has been picked up by the image pickup means M12.

The operation of the first embodiment will now be described with reference to the flowchart shown in FIGS. 4 through 6. Incidentally, for this embodiment of the invention, in the running-state detecting means M10 shown in FIG. 1, the transverse acceleration sensor M10a is used, but none of the yaw rate sensor M10b, the image pickup means M12, the road shape detecting means M13 and the receiving means M14 is used.

First, in Step Si, coordinates of a plurality of nodes $N_N$ ($N_N = N_1, N_2, N_3, \ldots$) lying within the examination interval are read in, and in Step S2, a link length $l_N$ and an intersection angle $\theta_N$ at each of the nodes $N_N$ are read in. As shown in FIG. 7, the link length $l_N$ is defined as a distance between adjacent node $N_N$ and $N_{N+1}$, and the intersection angle $\theta_N$ is defined as an angle made by a particular link $N_{N-1}\ N_N$ and a link $N_N\ N_{N+1}$ which lies immediately forward thereof. The link length $l_N$ and the intersection angle $\theta_N$ can be geometrically calculated because the positions of the nodes $N_N$ are given as their coordinates.

Then, the curve interval decision means (first decision means) M3 shown in FIG. 2 determines whether the node $N_N$ is present on a curve or a straight road. This decision is made in the following manner. In Step S3, $\theta_N/l_N$ at each node $N_N$ is calculated, and this $\theta_N/l_N$ is compared with a preset first decision reference value $\phi_{REF}$. If $\theta_N/l_N \geq \phi_{REF}$, it is determined that the node $N_N$ is present on a curve, and the process proceeds to Step S5. $\theta_N/l_N$ corresponds to the azimuth angle change quantity of the vehicle relative to the travel distance of the vehicle, and $\theta_N/l_N$ having a large value indicates that the road is curved, whereas $\theta_N/l_N$ having a small value indicates that the road is a straight road.

If it is determined in Step S3 that $\theta_N/l_N < \phi_{REF}$, the intersection angle $\theta_N$ is compared with a second decision reference value $\theta_{REF}$ in Step S4. If $\theta_N \geq \theta_{REF}$, i.e., the intersection angle $\theta_N$ itself is not less than the second decision reference value $\theta_{REF}$, it is determined that the road is curved, and the process proceeds to Step S5. On the other hand, if it is determined in Step S3 that $\theta_N/l_N < \phi_{REF}$ and it is determined in Step S4 that $\theta_N < \theta_{REF}$, it is determined in Step S15 that the road is a straight road. Incidentally, if the road is a straight road, the passage-state decision quantity $\theta_N/L_N$ to be described later is set to zero.

Figure 8A:
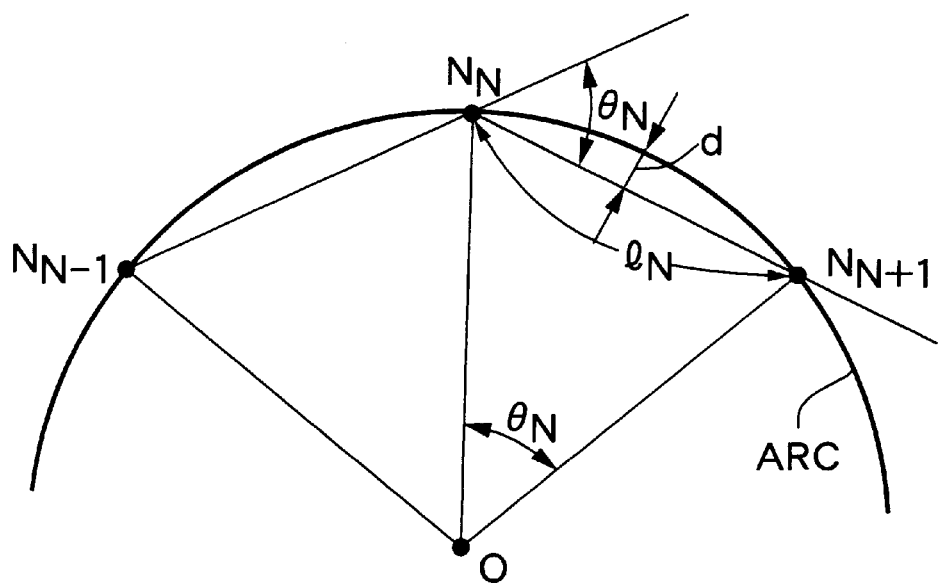
FIGS. 8A and 8B are explanatory views of Step S5 of the flowchart.

If, in the curve interval decision means (first decision means) M3, it is determined that the node $N_N$ is present on the curve, the second decision means $M4_1$ determines whether two successive nodes $N_N$ and $N_{N+1}$ are present on the same curve. The decision by the second decision means $M4_1$ is performed in the follow manner. In Step S5, the link length $l_N$ between the nodes $N_N$ and $N_{N+1}$ is compared with a third decision reference value $l_{maxN}$. If $l_N \leq l_{maxN}$, it is determined that the nodes $N_N$ and $N_{N+1}$ are present on the same curve, and the process proceeds to Step S6. If $l_N > l_{maxN}$, it is determined that the nodes $N_N$ and $N_{N+1}$ are not present on the same curve, and the process proceeds to Step The meaning of Step S5 will be described with reference to FIGS. 8A and 8B. FIG. 8A shows a representative example of a general curve, and shows the state in which three nodes $N_{N-1}$, $N_N$ and $N_{N+1}$ are equidistantly spaced apart from each other on the same arc centered about O. Since the intersection angle $\theta_N$ at the node $N_N$ is equal to the central angle of the arc $\angle N_N \theta N_{N+1}$, the link length $l_N$ between the nodes N and $N_{N+1}$ is given as:

$$l_N = 2d/\tan(\theta_N/4), \tag{1}$$

where d is a "zag" between the nodes N and $N_{N+1}$.

The "zag" d is a value which serves as a reference for setting the distance between adjacent nodes $N_N$ (i.e., the link length $l_N$) when map data on a road is to be created, and the shape of the road is represented by a minimum number of nodes $N_N$ in such a way that the positions of the respective nodes $N_N$ are set so that the "zag" d becomes equal to or smaller than a predetermined value (e.g., 3.5 m to 6 m). Accordingly, for a sharp curve, the link length $l_N$ between the adjacent nodes $N_N$ becomes small and the nodes $N_N$ are densely disposed, whereas for a gentle curve, the link length $l_N$ between the adjacent nodes $N_N$ becomes large and the nodes $N_N$ are coarsely disposed.

Figure 8B:
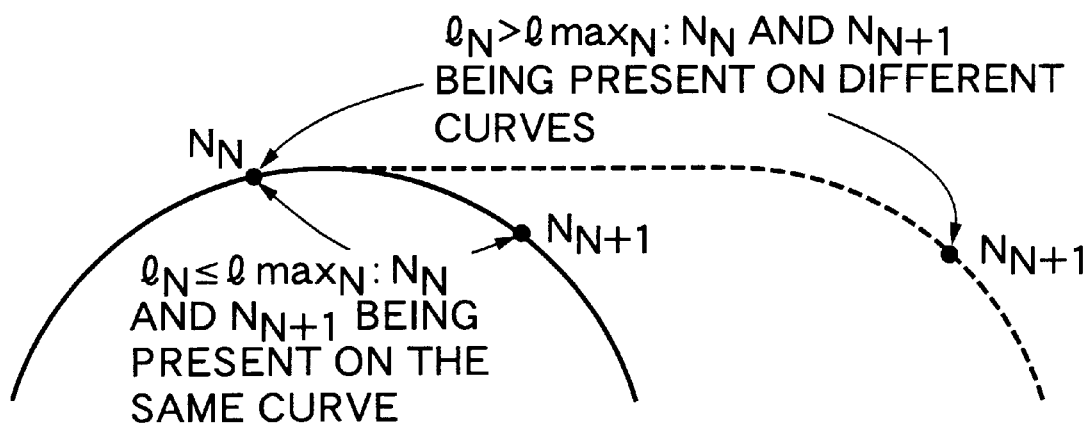

Thus, the third decision reference value $l_{maxN}$ is defined as a maximum link length as follows:

$$l_{maxN} = 2d/\tan(\theta_N/4), \tag{2}$$

and in Step S5, if $l_N \leq l_{maxN}$ is satisfied, it is determined that the nodes $N_N$ and $N_{N+1}$ are present on the same curve, whereas if $l_N \leq l_{maxN}$ is not satisfied, it is determined that the nodes $N_N$ and $N_{N+1}$ are present on different curves (refer to FIG. 8B).

If, in the second decision means $M4_1$, it is determined that the nodes $N_N$ and $N_{N+1}$ are present on the same curve, passage-state decision quantities $\theta_1/L_1 \ldots \theta_N/L_N$ of n nodes $N_1 \ldots N_N$ which are present on the same curve are determined in Step S6 by the third decision means $M4_2$ in the following manner. Regarding the first (N−1) nodes $N_1$ to $N_{N-1}$, their passage-state decision quantities $\theta_K/L_K$ (K=1 to N−1) are determined as:

$$\theta_K/L_K \leftarrow \theta_K/l_K \tag{3}$$

Then, the passage-state decision quantity $\theta_N/L_N$ at the last N-th node $N_N$ is determined as:

$$\theta_N/L_N \leftarrow \theta_N/(\text{a shorter value of } l_{N-1} \text{ or } l_{maxN}), \tag{4}$$

where $l_{maxN}$ is $l_{maxN} = 2d/\tan(\theta_N/4)$ defined in the above equation (2).

Figure 9A:
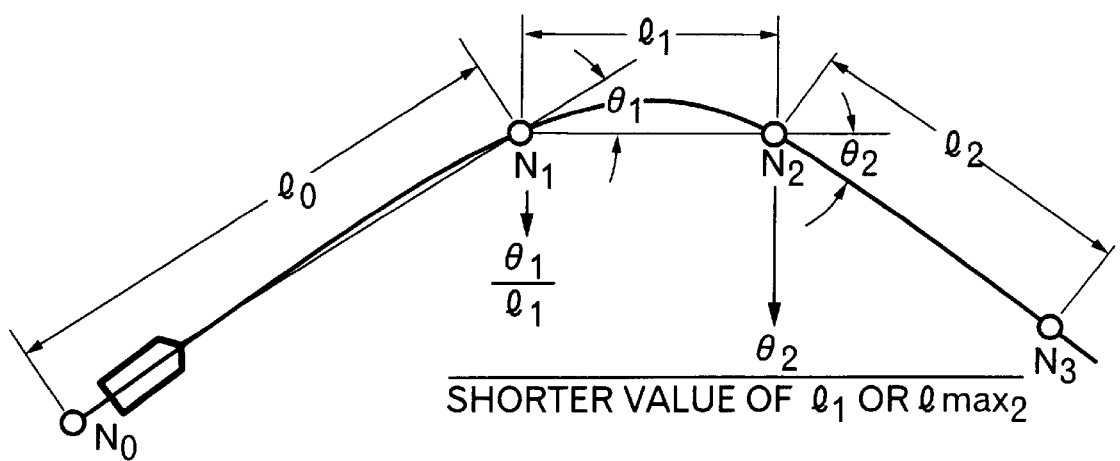
FIGS. 9A, 9B and 9C are explanatory views of a definition of a passage-state decision quantity $\theta_N/L_N$.
Figure 9B:
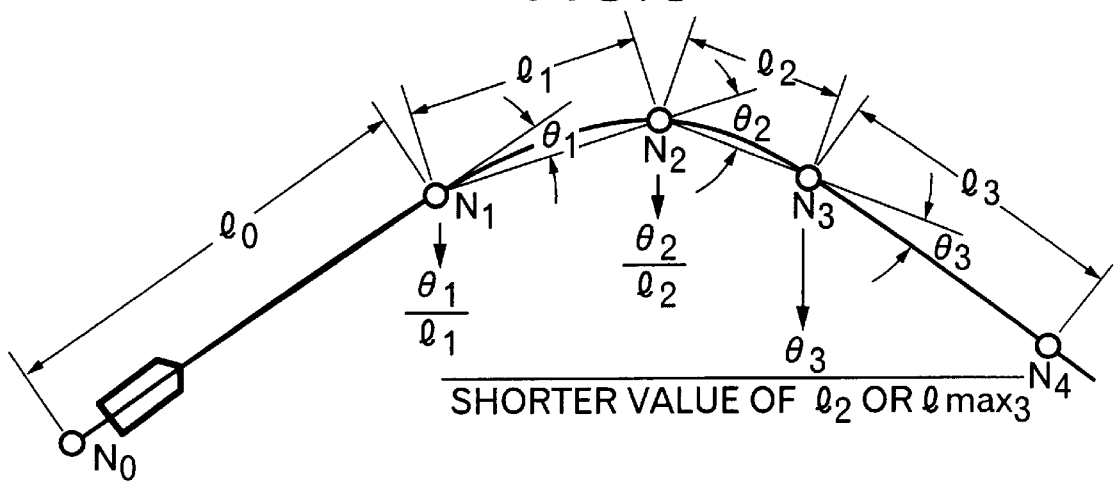
Figure 9C:
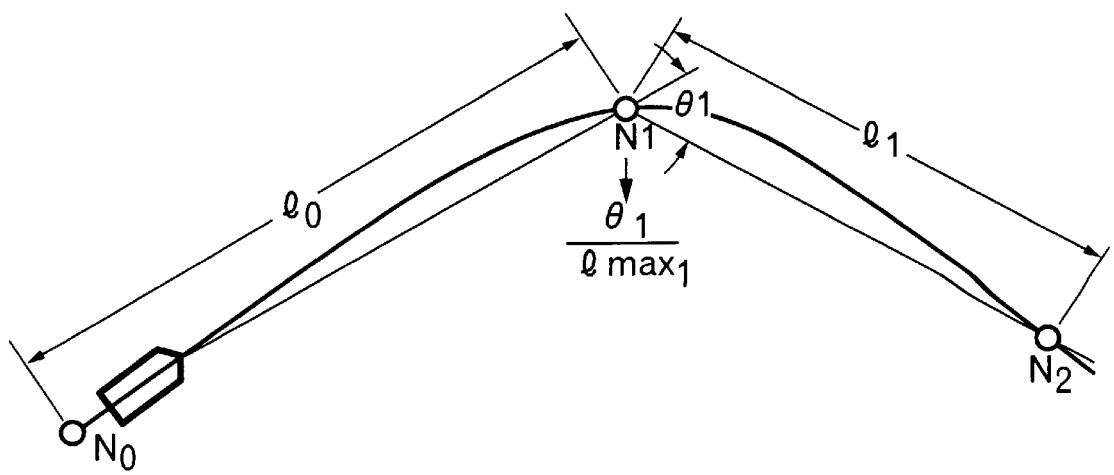

Specifically, as shown in FIG. 9A, if two nodes $N_1$ and $N_2$ are successively present on the same curve, the passage-state decision quantity $\theta_1/L_1$ at the first node $N_1$ is determined as $\theta_1/l_1$ and the passage-state decision quantity $\theta_2/L_2$ at the second (last) node $N_2$ is determined as $\theta_2/$(a shorter value of $l_1$ or $l_{max2}$). As shown in FIG. 9B, if three nodes $N_1$, $N_2$ and $N_3$ are successively present on the same curve, the passage-state decision quantities $\theta_1/L_1$ and $\theta_2/L_2$ at the first and second nodes $N_1$ and $N_1$ are respectively determined as $\theta_1/l_1$ and $\theta_2/l_2$ and the passage-state decision quantity $\theta_3/L_3$ at the third (last) node $N_3$ is determined as $\theta_3/$(a shorter value of $l_2$ or $l_{max3}$).

Incidentally, the last node $N_N$ of the plurality of nodes $N_1$ ... which are successively present on the same curve can be determined as a node $N_N$ which indicates that the answer in Step S5 has changed from YES to NO.

Then, in Step S7, the direction of the intersection angle $\theta_N$ at the node $N_N$ is compared with the direction of an intersection angle $\theta_{N+1}$ at the node $N_{N+1}$. If both directions are the same, it is determined in Step S8 that the two nodes $N_N$ and $N_{N+1}$ are present on a simple curve (a curve whose bending direction is constant). If such directions are opposite to each other, it is determined in Step S9 that the two nodes $N_N$ and $N_{N+1}$ are present on an S-shaped curve (a curve whose bending direction changes from right to left or from left to right).

On the other hand, if it is determined in the second decision means $M4_1$ (step S5) that the two nodes $N_N$ and $N_{N+1}$ are not present on the same curve, the passage-state decision quantity $\theta_N/L_N$ at the node $N_N$ which is independently present on the same curve is determined as follows in Step S10 by the third decision means $M4_2$ (refer to FIG. 9C):

$$\theta_N/L_N = \theta_N/l_{maxN} \tag{5}$$

Then, in Step S11, a fourth decision reference value $l_{maxN}S$ is calculated by using $L_N$ and $L_{N+1}$ of the above equation (5) as follows:

$$l_{maxN}S = L_N + L_{N+1} \tag{6}$$

The meaning of the fourth decision reference value $l_{maxN}S$ will be described later.

Then, in Step S12, the direction of the intersection angle $\theta_N$ at the node N is compared with the direction of an intersection angle $\theta_{N+1}$ at the node $N_{N+1}$. If both directions are the same, it is determined in Step S14 that the two nodes $N_N$ and $N_{N+1}$ are present on two different curves (which bend in the same direction).

On the other hand, if it is determined in Step S12 that the directions of the intersection angles $\theta_N$ and $\theta_{N+1}$ are opposite to each other, the link length $l_N$ is compared with the fourth decision reference value $l_{maxN}S$ in Step S13. If $l_N \leq l_{maxN}S$, it is determined in Step S13 that the two nodes $N_N$ and $N_{N+1}$ are present on the S-shaped curve, whereas if $l_N > l_{maxN}S$, it is determined in Step S14 that the two nodes $N_{N \text{ and } NN+1}$ are present on two different curves (which bend in the opposite directions).

Figure 10A:
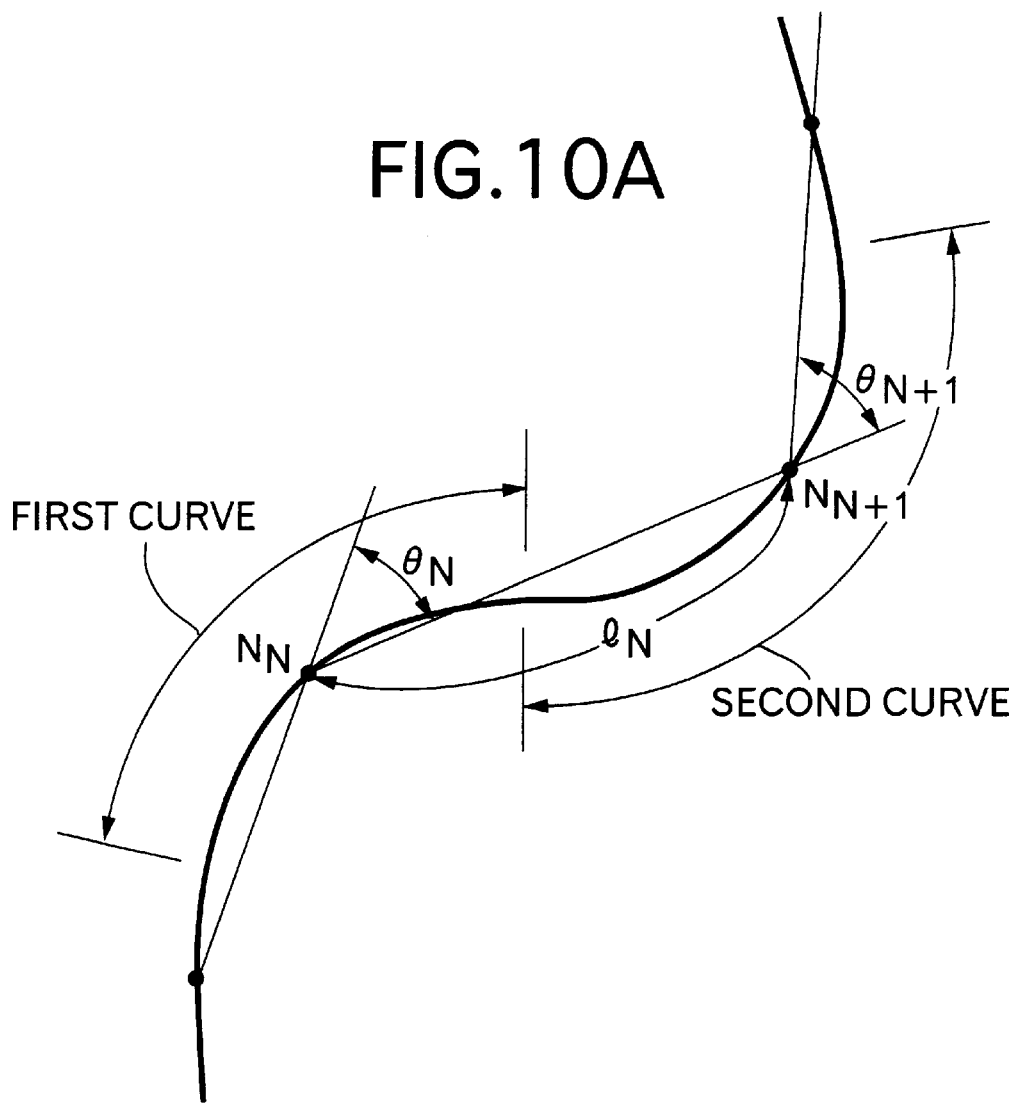
FIGS. 10A and 10B are explanatory views of Step S13 of the flowchart.
Figure 10B:
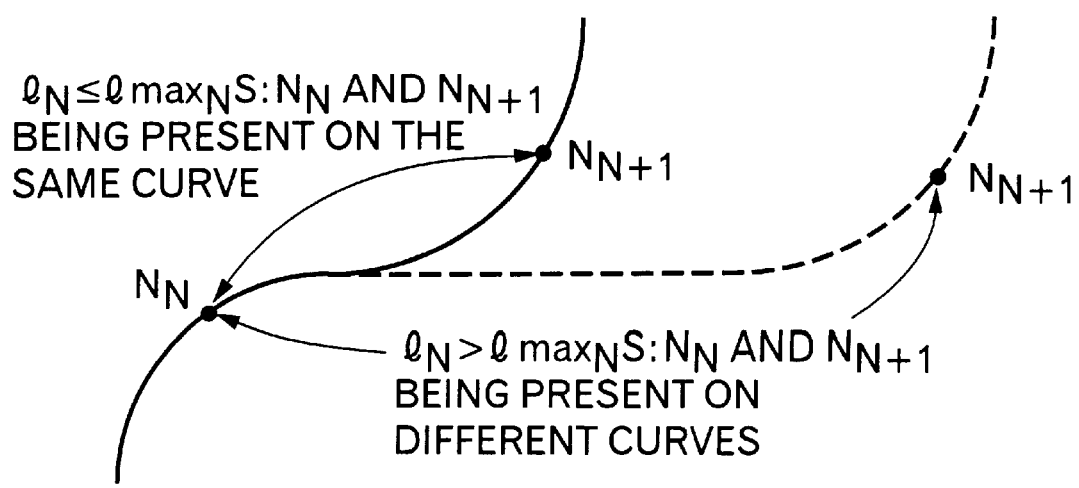

The meaning of Step S13 is as follows. If it is assumed that, as shown in FIG. 10A, the node $N_N$ is present on the first curve of an S-shaped curve consisting of two continuous arcs curved in opposite directions and the second node $N_{N+1}$ is present on the second curve of the S-shaped curve, the passage-state decision quantity $\theta_N/L_N$ required for the vehicle to pass the node $N_N$ and a passage-state decision quantity $\theta_{N+1}/L_{N+1}$ required for the vehicle to pass the node $N_{N+1}$ become $\theta_N/l_{maxN}$ and $\theta_{N+1}/l_{maxN+1}$, respectively, from the above equation (5). Accordingly, as shown in FIG. 10B, if the first curve is directly continuously followed by the second curve to form an S-shaped curve, the link length $l_N$ between the nodes $N_N$ and $N_{N+1}$ is to be not greater than $l_{maxN} + l_{maxN+1} = l_{maxN}S$. Contrarily, if the link length $l_N$ between the nodes $N_N$ and $N_{N+1}$ exceeds $l_{maxN}+l_{maxN+1}=l_{maxN}S$, the first curve and the second curve are to be successive different curves separated from each other by a straight line.

In the above-described manner, the state of the node $N_N$ on the curve is classified as any one of five kinds in any one of the above-described steps S8, S9, S13, S14 and S15, and in the following step S16, the passage-state decision quantity $\theta_N/L_N$ calculated in Step S6 or S10 is corrected by the first correction means $M4_4$ and the second correction means $M4_5$.

Figure 11A:
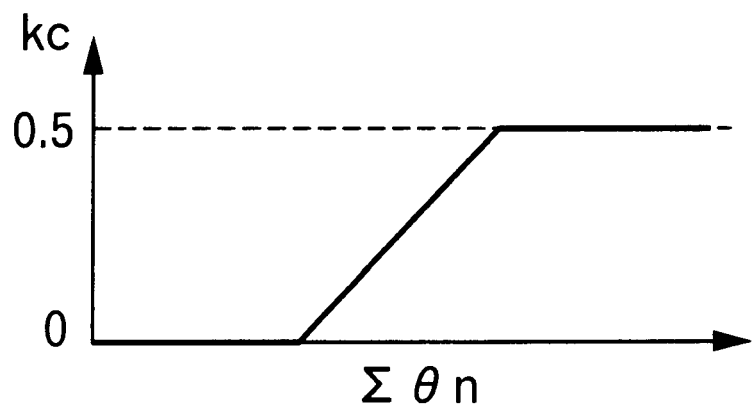
FIGS. 11A and 11B are views showing maps for retrieving correction coefficients $K_C$ and $K_S$.

First, a correction to be carried out by the first correction means $M4_4$ when a plurality of nodes $N_N$ are present on a simple curve (refer to Step S8) will be described. In this case, the passage-state decision quantity $\theta_N/L_N$ is calculated in Step S6, but even if the value of the calculated passage-state decision quantity $\theta_N/L_N$ is the same for a plurality of the nodes, as the total of the intersection angles $\theta_N$ on that curve becomes larger, it becomes more difficult for the vehicle to pass the curve. The reason for this will be understood from the fact that it is more difficult for the vehicle to pass a curve for which the vehicle needs to change its travelling direction by 90° than a curve for which the vehicle needs to change its travelling direction by 30°, even if both curves have the same radius of curvature. Accordingly, as shown in FIG. 11A, the summation $\Sigma\theta_N$ of the intersection angles $\theta_N$ at the plurality of nodes $N_N$ present on the curve is calculated, and a correction coefficient $K_C$ is retrieved from a map by using this $\Sigma\theta_N$ as a parameter. Then, the correction coefficient $K_C$ is used to correct the passage-state decision quantity $\theta_N/L_N$ by the following expression:

$$\theta_N/L_N \leftarrow (\theta_N/L_N) \times (1+K_C) \quad (7)$$

Since the correction coefficient $K_C$ increases from 0 to 0.5 with an increase in the summation $\Sigma\theta_N$ of the intersection angles $\theta_N$, the corrected passage-state decision quantity $\theta_N/L_N$ becomes a maximum of 1.5 times as large as the original passage-state decision quantity $\theta_N/L_N$. Therefore, the value of the passage-state decision quantity $\theta_N/L_N$ can be made a value which corresponds to the level of difficulty which the vehicle is to encounter in actually passing the curve.

Figure 11B:
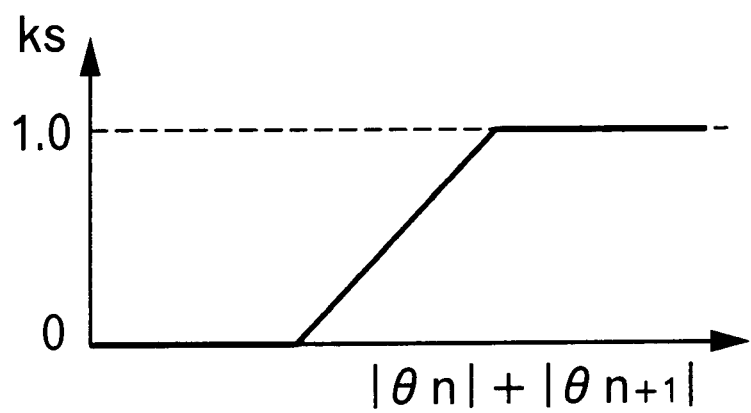

A correction to be carried out by the second correction means $M4_5$ when two nodes $N_N$ and $N_{N+1}$ are present on an S-shaped curve (refer to Steps S9 and S13) will be described. In this case, the passage-state decision quantity $\theta_N/L_N$ is calculated in Step S6 or S10, but even if the value of the calculated passage-state decision quantity $\theta_N/L_N$ is the same, it is more difficult for the vehicle to pass an S-shaped curve than a curve which bends in one direction. Accordingly, as shown in FIG. 11B, the sum $|\theta_N|+|\theta_{N+1}|$ of the absolute values of the intersection angles $\theta_N$ and $\theta_{N+1}$ at the two nodes $N_N$ and $N_{N+1}$ is calculated as a parameter and a correction coefficient $K_S$ is retrieved from a map. Then, the correction coefficient $K_S$ is used to correct the passage-state decision quantity $\theta_N/L_N$ by the following expression:

$$\theta_N/L_N \leftarrow (\theta_N/L_N) \times (1+K_S) \quad (8)$$

Since the correction coefficient Ks increases from 0 to 1.0 with an increase in the sum $|\theta_N|+|\theta_{N+1}|$ of the absolute values of the intersection angles $\theta_N$ and $\theta_{N+1}$, the corrected passage-state decision quantity $\theta_N/L_N$ becomes a maximum of 2.0 times as large as the original passage-state decision quantity $\theta_N/L_N$. Therefore, the value of the passage-state decision quantity $\theta_N/L_N$ can be made a value which corre-sponds to the level of difficulty which the vehicle is to encounter in actually passing the curve.

Incidentally, the yaw rate YR of the vehicle at the node $N_N$ is given as $\theta_N/t$ which is obtained by dividing the intersection angle $\theta_N$ which is the quantity of a change in the travelling direction of the vehicle by a time t required for the intersection angle $\theta_N$ to occur. Since the time t is given as $l_N/V$ which is obtained by dividing the link length $l_N$ by the vehicle speed V of the vehicle which passes the link length $l_N$, the yaw rate YR is finally calculated as the product of the passage-state decision quantity $\theta_N/L_N$ and the vehicle speed V.

$$YR = \theta_N/t = \theta_N/(l_N/V) = (\theta_N/l_N) \times V \quad (9)$$

On the other hand, the transverse acceleration G of the vehicle is given as the product of the yaw rate YR and the vehicle speed V.

$$G = YR \times V \quad (10)$$

Thus, in Step S17, the following equation is calculated from the above equations (9) and (10):

$$V = \{G/(\theta_N/L_N)\}^{1/2} \quad (11)$$

The above equation (11) shows that if a set limit transverse acceleration $G_{max}$ which is allowable when the vehicle is passing the curve is determined, the maximum passable speed $V_{maxN}$ at which the vehicle passes the curve can be obtained on the basis of the set limit transverse acceleration $G_{max}$ and the passage-state decision quantity $\theta_N/L_N$. The maximum passable speed $V_{maxN}$ is a maximum vehicle speed at which the vehicle can pass the curve in such a manner that the transverse acceleration of the vehicle does not exceed the set limit transverse acceleration $G_{max}$.

Then, in Step S18, the predicted passing speed $V_N$ at which the vehicle passes the node $N_N$ if the vehicle is assumed to start decelerating at the reference deceleration $\beta$ from the vehicle position P is calculated from:

$$V_N = (V^2 - 2\beta S_N)^{1/2} \quad (12)$$

where $S_N$ is the distance from the vehicle position P to the node $N_N$.

Then, in Step S19, the predicted passing speed $V_N$ is compared with the maximum passable speed $V_{maxN}$, and if $V_N \leq V_{maxN}$, it is determined that the vehicle can safely pass the node $N_N$, whereas if $V_N > V_{maxN}$, it is determined that the vehicle cannot easily pass the node $N_N$. If the vehicle cannot easily pass the node $N_N$, according to the determination of Step S20, the warning means M9a, the automatic deceleration means M9b and/or the automatic steering means M9c of the vehicle control means M9 is operated. Thus, voluntary braking by the driver, automatic deceleration and/or automatic steering is carried out so that the vehicle can positively and safely pass the curve.

Then, in Step S21, the actual transverse acceleration G of the vehicle is detected by the transverse acceleration sensor M10a of the running-state detecting means M10, and in Step S22, a reference transverse acceleration $G_0$ is calculated on the basis of the set limit transverse acceleration $G_{max}$ to be used for calculating the maximum passable speed $V_{maxN}$. Before the vehicle reaches a regulating-means operation permitting position in the pre-read interval (refer to FIG. 3), the vehicle control means M9 operates on the basis of the result obtained by comparing the predicted passing speed $V_N$ with the maximum passable speed Van in Step S19, whereby the operation of regulating means M11 is inhibited. In Step S23, when the vehicle reaches the regulating-means operation permitting position (refer to FIG. 3), the operation of the regulating means M11 is inhibited on the basis of the actual transverse acceleration G and the reference transverse acceleration $G_0$.

Specifically, in Step S24, an integral value $\int G$ of the actual transverse acceleration G is compared with an integral value $\int G_0$ of the reference transverse acceleration $G_0$, and if $\int G < \int G_0$, the process returns to Step S19 without operating the regulating means M11. If it is determined in Step S24 that $\int G \geq \int G_0$, the process proceeds to Step S25, in which the actual transverse acceleration G is compared with the reference transverse acceleration $G_0$ and if $G \geq G_0$, the process proceeds to Step S26. In Step S26, a differential value dG/dt of the actual transverse acceleration G is compared with a differential value $dG_0/dt$ of the reference transverse acceleration Go, and if $dG/dt \geq dG_0/dt$, it is determined that it is difficult for the vehicle to pass the curve, and in Step S27, the operation of the vehicle control means M9 is forcedly continued. The forced operation of the vehicle control means M9 is continued until $dG/dt < dG_0/dt$ is reached in Step S26. If $dG/dt < dG_0/dt$ from the beginning in Step S26, it is determined that the vehicle can pass the curve with only a normal operation of the vehicle control means M9, and the process returns to Step S19.

If $G < G_0$ in Step S25 and $dG/dt \leq dG_0/dt$ in Step S28, it is determined that the normal operation of the vehicle control means M9 provides excessive control, and in Step S29, the operation of the vehicle control means M9 is inhibited or stopped. The inhibition or stoppage of the operation of the vehicle control means M9 is continued until $dG/dt > dG_0/dt$ is reached in Step S28. If $dG/dt > dG_0/dt$ from the beginning in Step S28, it is determined that even if the vehicle control means M9 is normally operated, there is no likelihood that excessive control is performed, and the process returns to Step S19.

As described above, if it is determined in steps S3 and S4 that the node $N_N$ is present on a curve, the passage-state decision quantity $\theta_N/L_N$ at the node $N_N$ present on the curve is specifically calculated. Accordingly, computational load is reduced by avoiding calculating the passage-state decision quantity $\theta_N/L_N$ which is not necessary for the vehicle which is running on a straight road, whereby it is possible to reduce the size of an electronic control unit. In addition, the passage-state decision quantity $\theta_N/L_N$ which is a parameter which appropriately represents the level of difficulty which the vehicle is to encounter in passing the node is used to determine whether the vehicle can pass the curve, whereby even if only one or two nodes $N_N$ are present on a curve, it is possible to accurately determine whether the vehicle can pass the curve.

Furthermore, the actual running state (the actual transverse acceleration G) of the vehicle which is detected by the running-state detecting means M10 is compared with the reference transverse acceleration Go which is presumed to occur on the curve on the basis of the curve shape detected by the passage-state decision quantity calculating means M4, and the controlled variable or the regulating timing of the vehicle control means M9 is changed on the basis of the result of such comparison. Accordingly, the driver is prevented from experiencing uneasy feelings due to excessive or insufficient control by the vehicle control means M9.

Figure 12:
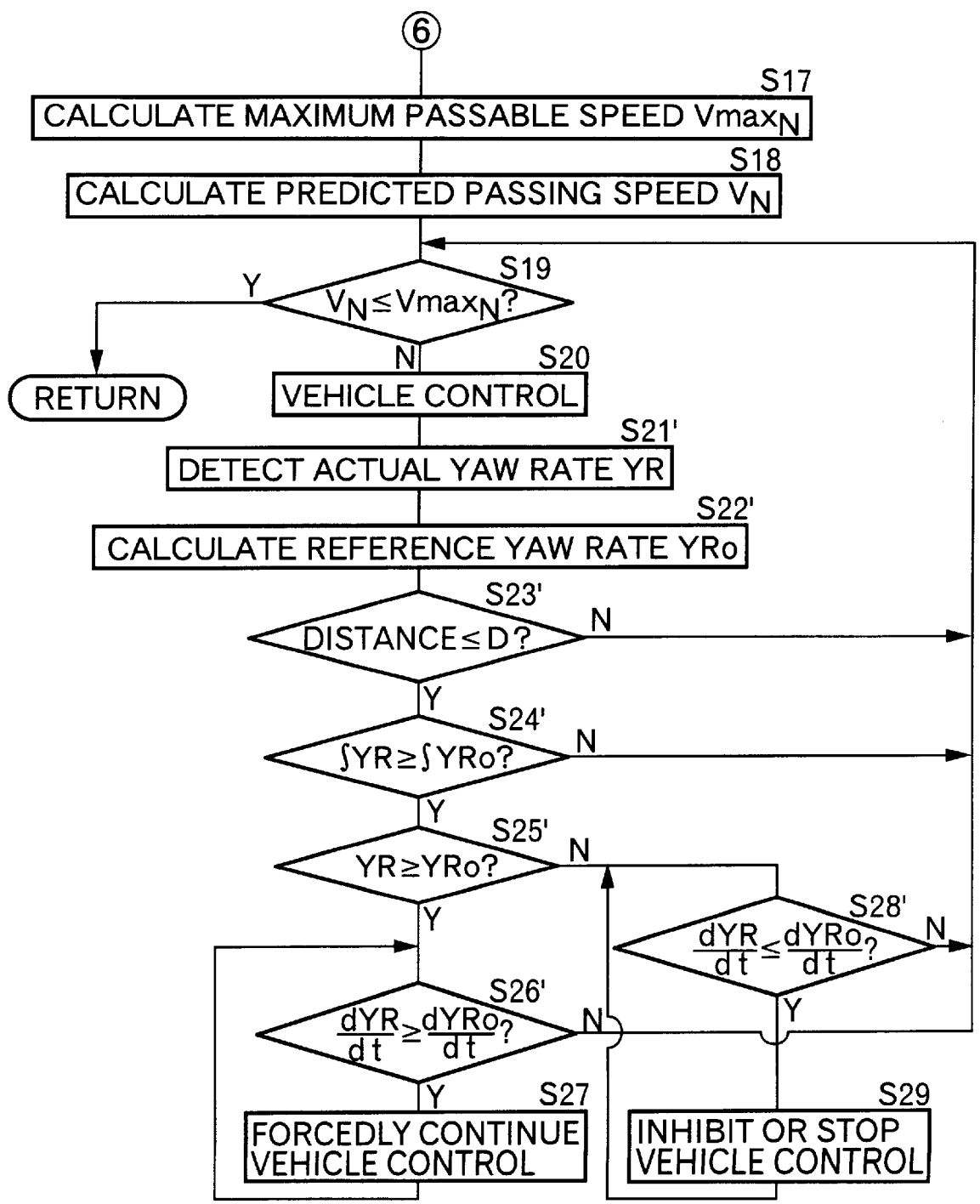
FIG. 12 is a flowchart similar to FIG. 6, showing the second preferred embodiment of the invention.

The second embodiment of the present invention will be described below with reference to FIG. 12.

Although in the first embodiment the transverse acceleration sensor M10$a$ is used as the running-state detecting means M10, the second embodiment uses the yaw rate sensor M10$b$ instead of the transverse acceleration sensor M10$a$. In Steps S21' to S26' and S28' of the flowchart shown in FIG. 12, the actual yaw rate YR and a reference yaw rate $YR_0$ are substituted for the actual transverse acceleration G and the reference transverse acceleration $G_0$ which are used in Steps S21 to S26 and S28 of FIG. 6, but the other steps are the same in the both flowcharts. The reference yaw rate $YR_0$ is a yaw rate calculated on the basis of the set limit yaw rate $YR_{max}$ which is used for the calculation of the maximum passable speed $V_{maxN}$ in the maximum passable speed calculating means M5.

Thus, even with the second embodiment, it is possible to obtain advantages and effects identical to those of the first embodiment.

Figure 13:
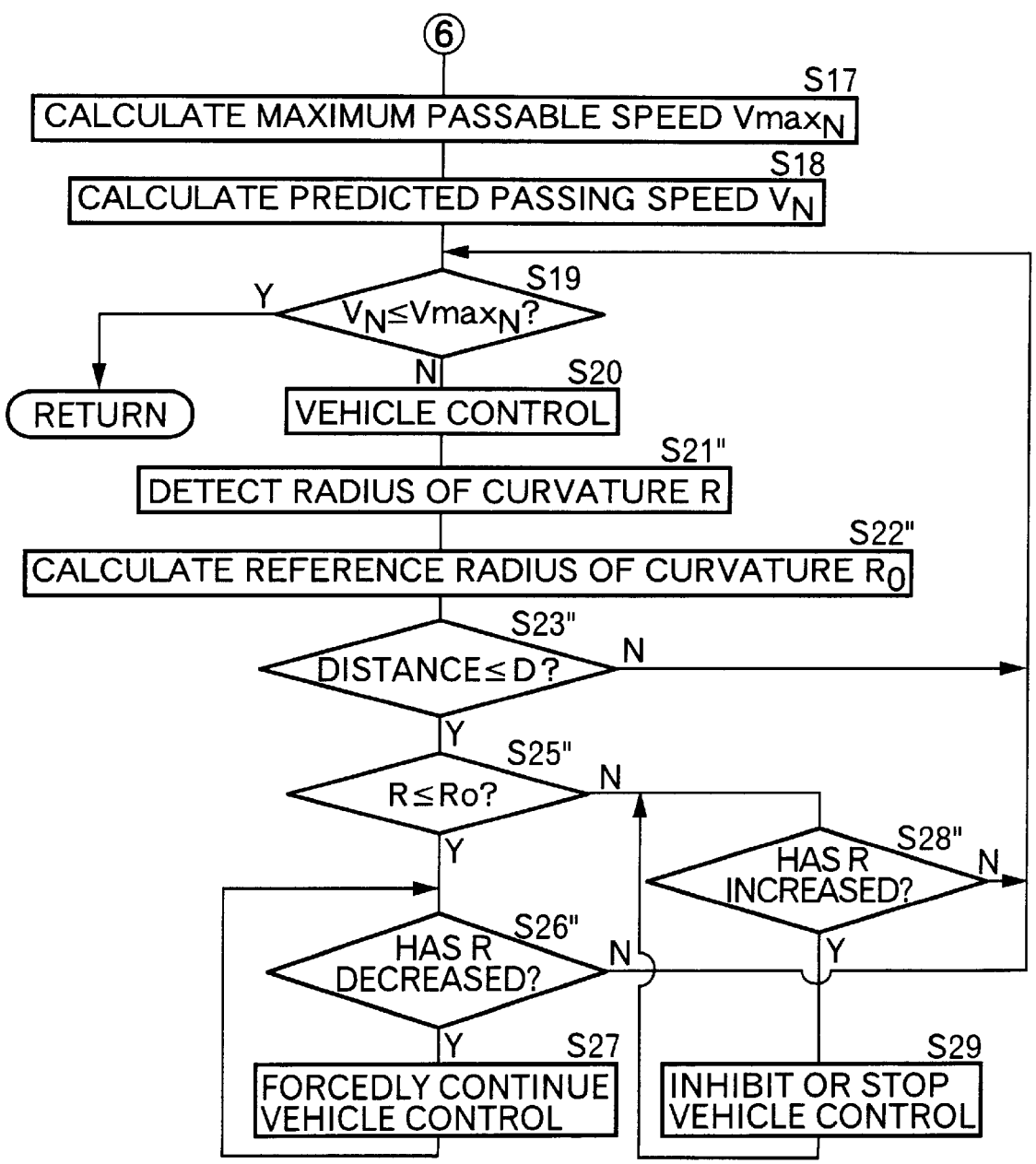
FIG. 13 is a flowchart similar to FIG. 6, showing the third preferred embodiment of the invention.
Figure 15A:
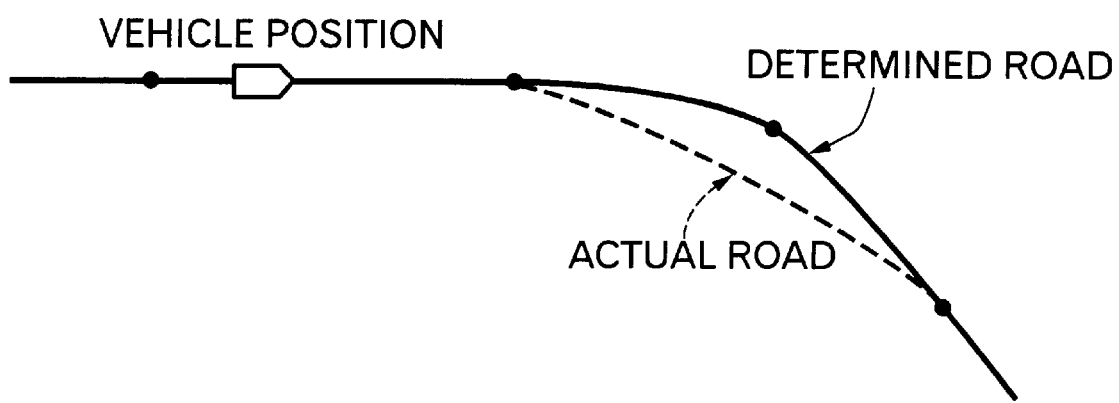
FIGS. 15A and 15B are explanatory views of problems of known vehicle control apparatus.
Figure 15B:
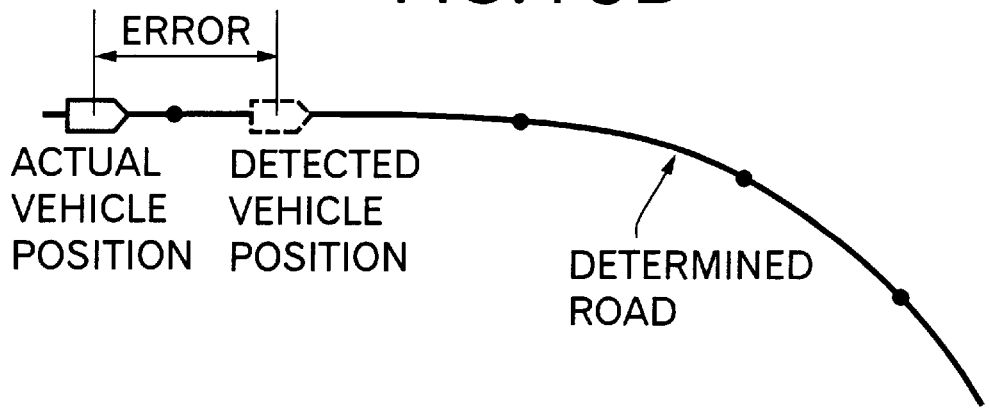

The third embodiment of the present invention will be described below with reference to FIG. 13.

In the third embodiment, the image pickup means M12 and the road shape detecting means M13 are used instead of the running-state detecting means M10 used in the first and second embodiments. The road shape detecting means M13 detects an actual curve shape of a road on the basis of an image of a white line on the road which is picked up by the image pickup means M12 including a television camera, and compares the actual curve shape with the curve shape detected by the passage-state decision quantity calculating means M4, and the regulating means M11 regulates the operation of the vehicle control means M9.

The above operation will be specifically described with reference to FIG. 13 which is similar to each of FIGS. 6 and 12. In Step S21", an actual radius of curvature R of the curve is detected by the road shape detecting means M13, and in Step S22", a reference radius of curvature $R_0$ of the curve is calculated on the basis of the curve shape detected by the passage-state decision quantity calculating means M4. If it is determined in Step S23" that the vehicle has reached the regulating-means operation permitting position (refer to FIG. 3), the actual radius of curvature R is compared with the reference radius of curvature $R_0$ in Step S25", and if $R \leq R_0$, the process proceeds to Step S26". If it is determined in Step S26" that the actual radius of curvature R has decreased, it is determined that the vehicle cannot easily pass the curve, and in Step S27, the operation of the vehicle control means M9 is forcedly continued. Such forced operation of the vehicle control means M9 is continued until it is determined in Step S26" that the actual radius of curvature R has started increasing. If the actual radius of curvature R has started increasing from the beginning, it is determined that the vehicle can pass the curve with only the normal operation of the vehicle control means M9, and the process returns to Step S19.

If R>Ro in Step S25" and the actual radius of curvature R has increased in Step S28", it is determined that the normal operation of the vehicle control means M9 provides excessive control, and in Step S29, the operation of the vehicle control means M9 is inhibited or stopped. The inhibition or stoppage of the operation of the vehicle control means M9 is continued until the actual radius of curvature R starts decreasing in Step S28". If the actual radius of curvature R has started decreasing from the beginning in Step S28", it is determined that even if the vehicle control means M9 is normally operated, there is no likelihood that excessive control is performed, and the process returns to Step S19.

Thus, even with the third embodiment, it is possible to obtain advantages and effects identical to those of the first and second embodiments.

The fourth embodiment of the present invention will be described.

Although in the third embodiment the image pickup means M12 and the road shape detecting means M13 are used to detect the state of an actual curve of a road (such as a radius of curvature, an entrance or an exit of the road), the fourth embodiment is adapted to receive the state of such actual curve from the receiving means M14 such as a beacon installed in the vicinity of the road (refer to FIG. 1). The other construction, operation and effects are the same as those of the third embodiment.

Fifth and sixth embodiments of the present invention will be described below.

As shown in FIG. 14, each of the fifth and sixth embodiments is provided with the receiving means M14 instead of the map information output means M1 and the vehicle position detecting means M2 of the first to fourth embodiments (refer to FIG. 1). The receiving means M14 detects the shape of a road and a vehicle position from a radio wave or a beacon installed in the vicinity of the road, and the maximum passable speed calculating means M5' calculates the maximum passable speed $V_{maxN}$ on the basis of the result of such detection, and the predicted passing speed calculating means M7' calculates the predicted passing speed $V_N$. Accordingly, it is possible to determine whether the vehicle can pass the curve, by comparing the predicted passing speed $V_N$ with the maximum passable speed $V_{maxN}$ in the passage-possible/impossible decision means M8'.

At this time, the operation of the vehicle control means M9 is regulated by the regulating means M11, but in the fifth embodiment, such regulation is carried out on the basis of a signal from the running-state detecting means M10 in a manner similar to that described previously in connection with the first and second embodiments. In the sixth embodiment, the regulation is carried out on the basis of signals from the image pickup means M12 and the road shape detecting means M13 in a manner similar to that described previously in connection with the third embodiment.

Although the present invention has been described above in detail, various design changes can be made without departing from the scope of the present invention.

For example, although in each of the above-described preferred embodiments, the maximum passable speed $V_{maxN}$ is calculated on the basis of the set limit transverse acceleration $G_{max}$, it is also possible to calculate the maximum passable speed $V_{maxN}$ on the basis of the set limit yaw rate $YR_{max}$, instead of the set limit transverse acceleration $G_{max}$. Specifically, the maximum passable speed $V_{maxN}$ may also be calculated from the above equation (9) as follows:

$$V_{maxN} = YR_{max}/(\theta_N/L_N) \tag{13}$$

As described above, in accordance with the first aspect of the invention, in controlling a vehicle on the basis of road data on a road forward of a vehicle position thereof and a vehicle speed thereof, at least one of the controlled variable and the control timing of the vehicle control means is regulated on the basis of a detected running state of the vehicle. Accordingly, any error in the road data and any error in the vehicle position are compensated for to execute appropriate vehicle control, thereby making it possible to reduce occurrences of uneasy feelings of improper control experienced by a driver.

In accordance with the second aspect of the invention, in controlling a vehicle on the basis of road data on a road forward of a vehicle position thereof and a vehicle speed thereof, at least one of the controlled variable and the control timing of the vehicle control means is regulated on the basis of a detected road shape. Accordingly, any error in the road data and any error in the vehicle position are compensated for to execute appropriate vehicle control, thereby making it possible to reduce occurrences of uneasy feelings of improper control experienced by a driver.

In accordance with the third aspect of the invention, in controlling a vehicle on the basis of road data on a road forward of a vehicle position thereof and a vehicle speed thereof, at least one of the controlled variable and the control timing of the vehicle control means is regulated on the basis of a received information on the road shape. Accordingly, any error in the road data and any error in the vehicle position are compensated for to execute appropriate vehicle control, thereby making it possible to reduce occurrences of uneasy feelings of improper control experienced by a driver.

In accordance with the fourth aspect of the invention, in controlling a vehicle on the basis of a vehicle speed thereof and information on a road shape, which information is provided from outside the vehicle, at least one of the controlled variable and the control timing of the vehicle control means is regulated on the basis of a detected running state of the vehicle. Accordingly, any error in the road data and any error in the vehicle position are compensated for to execute appropriate vehicle control, thereby making it possible to reduce occurrences of uneasy feelings of improper control experienced by a driver.

In accordance with the fifth aspect of the invention, in controlling a vehicle on the basis of a vehicle speed thereof and information on a road shape, which information is provided from outside the vehicle, at least one of the controlled variable and the control timing of the vehicle control means is regulated on the basis of a detected road shape. Accordingly, any error in the road data and any error in the vehicle position are compensated for to execute appropriate vehicle control, thereby making it possible to reduce occurrences of uneasy feelings of improper control experienced by a driver.

In accordance with the sixth aspect of the invention, since the running state of a vehicle is detected on the basis of a transverse behavior quantity of the vehicle, it is possible to accurately detect the running state.

In accordance with the seventh aspect of the invention, a transverse behavior quantity of a vehicle calculated on the basis of road data on a road forward of a vehicle position thereof or received information is compared with an actually detected transverse behavior quantity of the vehicle to thereby regulate at least one of the aforesaid controlled variable and control timing. Accordingly, it is possible to realize control adapted to the actual transverse behavior quantity of the vehicle.

In accordance with an eighth aspect of the invention, since the running state of a vehicle is detected on the basis of a directional change quantity of a road, it is possible to accurately detect the running state.

In accordance with a ninth aspect of the invention, a directional change quantity of a road calculated on the basis of road data on a road forward of a vehicle position, or received information, is compared with an actually detected directional change quantity of the road to thereby regulate at least one of the aforesaid controlled variable and control timing. Accordingly, it is possible to realize control adapted to the actual directional change quantity of the road.

In accordance with a tenth aspect of the invention, since at least one of the aforesaid controlled variable and control timing is regulated on the basis of the distance from a vehicle position to a control target position on a road, it is possible to easily regulate the control timing.

In accordance with an eleventh aspect of the invention, since control for the vehicle is a warning to a driver, the driver can be warned to carry out a voluntary deceleration or a steering operation so that the vehicle positively and safely passes a curve.

In accordance with a twelfth aspect of the invention, since control for the vehicle is automatic vehicle control, the vehicle is automatically decelerated to positively and safely pass a curve.

In accordance with a thirteenth aspect of the invention, since control for the vehicle is automatic steering control, the vehicle is automatically steered to positively and safely pass a curve.

The scope of the invention is indicated by the appended claims rather than by the foregoing discussion of presently preferred embodiments.

We claim:

1. A vehicle control apparatus comprising:
   map information output means for outputting map information containing road data;
   vehicle position detecting means for detecting a vehicle position on a map;
   vehicle speed detecting means for detecting a vehicle speed;
   vehicle control means for controlling a vehicle based on the road data on a road forward of the vehicle position and the detected vehicle speed;
   running-state detecting means for detecting a running state of the vehicle; and
   regulating means for regulating at least one of a controlled variable and a control timing of said vehicle control means based on the detected running state of the vehicle.

2. A vehicle control apparatus according to claim 1, wherein the running state of the vehicle is detected based on a transverse behavior quantity of the vehicle.

3. A vehicle control apparatus according to claim 2, wherein said regulating means compares a reference transverse behavior quantity of the vehicle, which is calculated based on the road data on the road forward of the vehicle position, with a detected transverse behavior quantity of the vehicle to thereby regulate at least one of the controlled variable and the control timing.

4. A vehicle control apparatus according to claim 1, wherein the running state of the vehicle is detected based on a directional change quantity of the road.

5. A vehicle control apparatus according to claim 4, wherein said regulating means compares a reference directional change quantity of the road, which is calculated based on the road data on the road forward of the vehicle position, with a detected directional change quantity of the vehicle to thereby regulate at least one of the controlled variable and the control timing.

6. A vehicle control apparatus according to claim 1, wherein said regulating means regulates at least one of the controlled variable and the control timing additionally based on a distance from the vehicle position to a control target position on the road.

7. A vehicle control apparatus according to claim 1, wherein said control means controls the vehicle by providing a warning to a driver.

8. A vehicle control apparatus according to claim 1, wherein said control means controls the vehicle by effecting automatic vehicle control.

9. A vehicle control apparatus according to claim 1, wherein said control means controls the vehicle by effecting automatic steering control.

10. A vehicle control apparatus according to claim 1, further including:

image pickup means for picking up an image of the road forward of the vehicle; and
    road shape detecting means for detecting a road shape based on the image of the road;
    said regulating means regulates at least one of said controlled variable and the control timing of said vehicle control means further based on the detected road shape.

11. A vehicle control apparatus according to claim 1, further including:
    receiving means for receiving information on a road shape, which information is provided from outside the vehicle; and
    said regulating means regulates at least one of said controlled variable and the control timing of said vehicle control means further based on the received information on road shape.

12. A vehicle control apparatus comprising:
    map information output means for outputting map information containing road data;
    vehicle position detecting means for detecting a vehicle position on a map;
    vehicle speed detecting means for detecting a vehicle speed;
    vehicle control means for controlling a vehicle based on the road data on a road forward of the vehicle position and the detected vehicle speed;
    image pickup means for picking up an image of the road forward of the vehicle;
    road shape detecting means for detecting a road shape based on the image of the road; and
    regulating means for regulating at least one of a controlled variable and a control timing of said vehicle control means based on the detected road shape.

13. A vehicle control apparatus according to claim 12, wherein said regulating means regulates at least one of the controlled variable and the control timing additionally based on a distance from the vehicle position to a control target position on the road.

14. A vehicle control apparatus comprising:
    map information output means for outputting map information containing road data;
    vehicle position detecting means for detecting a vehicle position on a map;
    vehicle speed detecting means for detecting a vehicle speed;
    vehicle control means for controlling a vehicle based on the road data on a road forward of the vehicle position and the detected vehicle speed;
    receiving means for receiving information on a road shape, which information is provided from outside the vehicle; and
    regulating means for regulating at least one of a controlled variable and a control timing of said vehicle control means based on the received information on the road shape.

15. A vehicle control apparatus according to claim 14, wherein said regulating means regulates at least one of the controlled variable and the control timing additionally based on a distance from the vehicle position to a control target position on the road.

16. A vehicle control apparatus comprising:
    receiving means for receiving information on a road shape, which information is provided from outside a vehicle;

vehicle speed detecting means for detecting a vehicle speed;

vehicle control means for controlling the vehicle based on the received information and the detected vehicle speed;

running-state detecting means for detecting a running state of the vehicle; and regulating means for regulating at least one of a controlled variable and a control timing of said vehicle control means based on the detected running state of the vehicle.

17. A vehicle control apparatus according to claim 16, wherein the running state of the vehicle is detected based on a transverse behavior quantity of the vehicle.

18. A vehicle control apparatus according to claim 17, wherein said regulating means compares a reference transverse behavior quantity of the vehicle, which is calculated based on the received information, with a detected transverse behavior quantity of the vehicle to thereby regulate at least one of the controlled variable and the control timing.

19. A vehicle control apparatus according to claim 16, wherein the running state of the vehicle is detected based on a directional change quantity of the road.

20. A vehicle control apparatus according to claim 19, wherein said regulating means compares a reference directional change quantity of the road, which is calculated based on the received information, with a detected directional change quantity of the vehicle to thereby regulate at least one of the controlled variable and the control timing.

21. A vehicle control apparatus according to claim 16, wherein said regulating means regulates at least one of the controlled variable and the control timing additionally based on a distance from the vehicle position to a control target position on the road.

22. A vehicle control apparatus comprising:

receiving means for receiving information on a road shape, which information is provided from outside a vehicle;

vehicle speed detecting means for detecting a vehicle speed;

vehicle control means for controlling the vehicle based on the received information and the detected vehicle speed;

image pickup means for picking up an image of a road forward of the vehicle;

road shape detecting means for detecting a road shape based on the image of the road; and regulating means for regulating at least one of a controlled variable and a control timing of said vehicle control means based on the detected road shape.

23. A vehicle control apparatus according to claim 22, wherein said regulating means regulates at least one of the controlled variable and the control timing additionally based on a distance from the vehicle position to a control target position on the road.

* * * * *

UNITED STATES PATENT AND TRADEMARK OFFICE
CERTIFICATE OF CORRECTION

PATENT NO : 6,141,617
DATED : 31 October 2000
INVENTOR(S): Shohei Matsuda, Hiroshi Sekine, Makoto Otabe, Yuji Sakaki It is certified that error appears in the above-identified patent and that said Letters Patent are hereby corrected as shown below:

Column 1, line 12, change "Applicaiton" to --Application--.
Column 3, line 60, change "$K_C$ and $K_S$" to --kc and ks--.
Column 4, line numbered between 26 and 27, change "$K_C$ and $K_S$" to --kc and ks--.
Column 5, line 61, delete "4".
Column 6, line 34, change "Si" to --S1--;
 line 50, change "$\phi_{REF}$" (both occurrences) to --$\psi_{REF}$--;
 line 57, change "$\phi_{REF}$" to --$\psi_{REF}$--;
 line 59, change "$\theta_N \geq \phi_{REF}$" to --$\theta_N \geq \theta_{REF}$--;
 line 63, change "$\phi_{REF}$" to --$\psi_{REF}$--.
Column 7, line 6, change "follow" to --following--;
 line 13, change "Step" to --Step 10.--;
 line 20, change "$\angle N_N \theta N_{N+1}$" to --$\angle N_N O N_{N+1}$--;
 line approximately 23 (in equation (1)), change "$1_N$" to --$l_N$--;
 line 40 (in equation (2)), change "$1_N$" to --$l_N$--.
Column 8, line 5, change "$N_1$ and $N_1$" to --$N_1$ and $N_2$--;
 line 51, change "$N_N$ and $N_{N+1}$" to --$N_N$ and $N_{N+1}$--.
Column 9, line 29, change "$K_C$" to --kc--;
 line 30, change "$K_C$" to --kc--;
 line approximately 33 (in equation (7)), change "$K_C$" to --kc--;
 line numbered between 35 and 36, change "$K_C$" to --kc--;
 line numbered between 55 and 56, change "$K_S$" to --ks--;
 line numbered between 56 and 57, change "$K_S$" to --ks--;
 line approximately 59 (in equation (8)), change "$K_S$" to --ks--;
 line 61, change "Ks" to --ks--.
Column 10, line 66, change "Van" to --$V_{maxN}$--.

UNITED STATES PATENT AND TRADEMARK OFFICE
CERTIFICATE OF CORRECTION

PATENT NO : 6,141,617
DATED : 31 October 2000
INVENTOR(S): Shohei Matsuda, Hiroshi Sekine, Makoto Otabe, Yuji Sakaki It is certified that error appears in the above-identified patent and that said Letters Patent are hereby corrected as shown below:

Column 11, line 6, change "$fG$" to --$\int G$--;
       line 8, change "$fG$" to --$\int G$--;
       line 9, change "$fG < fG_0$" to --$\int G < \int G_0$--;
       line 11, change "$fG \geq fG_0$" to --$\int G \geq \int G_0$--;
       line 17, change "Go" to --$G_0$--;
       line 55, change "Go" to --$G_0$--.

Signed and Sealed this

Twenty-fourth Day of April, 2001

Attest:

NICHOLAS P. GODICI

Attesting Officer     Acting Director of the United States Patent and Trademark Office